(12) United States Patent
Rakib

(10) Patent No.: US 7,007,296 B2
(45) Date of Patent: Feb. 28, 2006

(54) ACTIVE CABLE MODEM OUTSIDE CUSTOMER PREMISES SERVICING MULTIPLE CUSTOMER PREMISES

(75) Inventor: Selim Shlomo Rakib, Cupertino, CA (US)

(73) Assignee: Terayon Communications, Inc., Santa Clara, CA (US)

( * ) Notice: Subject to any disclaimer, the term of this patent is extended or adjusted under 35 U.S.C. 154(b) by 682 days.

(21) Appl. No.: 09/942,816

(22) Filed: Aug. 29, 2001

(65) Prior Publication Data

US 2003/0046706 A1 Mar. 6, 2003

(51) Int. Cl.
H04N 7/173 (2006.01)

(52) U.S. Cl. .................. 725/111; 725/110; 725/127; 725/128; 375/222

(58) Field of Classification Search ............. 725/110, 725/111; 379/88.01, 218.01, 257; 370/252, 370/352, 354, 351, 401, 420, 465, 467; 375/222; 709/230
See application file for complete search history.

(56) References Cited

U.S. PATENT DOCUMENTS

| 5,870,134 | A | * | 2/1999 | Laubach et al. ............ 725/123 |
| 6,012,113 | A | | 1/2000 | Tuckner |
| 6,044,107 | A | | 3/2000 | Gatherer et al. |
| 6,055,268 | A | | 4/2000 | Timm et al. |
| 6,075,972 | A | * | 6/2000 | Laubach et al. ........... 455/3.05 |
| 6,137,793 | A | | 10/2000 | Gorman et al. |
| 6,259,775 | B1 | | 7/2001 | Alpert et al. |
| 2002/0044567 | A1 | | 4/2002 | Volt et al. |

\* cited by examiner

Primary Examiner—Kieu-Oanh Bui
(74) Attorney, Agent, or Firm—Thelen Reid & Priest LLP

(57) ABSTRACT

A signal distribution system to save on the cost of cable modems for cable TV headend operators who wish to deliver broadband digital data services, DSL, video-on-demand or POTS service over their HFC CATV delivery networks. All species within the genus have a shared cable modem and a filtration and combining circuit comprised of a plurality of diplexer filters or junction boxes or both which mix baseband packet data with analog CATV signals onto coax drop lines coupled to the various subscribers and connect POTS or DSL signals onto twisted pair portions of siamese cables. Various species have the cable modem feeding digital data or packets of DOCSIS or other data or digitized DSL signals sent over the HFC to the cable modem or digitized POTS signals send over the HFC to the cable modem to either a packet switch, a DSL concentrator, a voice-over-IP gateway or some combination of the above. This data is either delivered to each subscriber as LAN packets or analog POTS signals or DSL signals or some combination of the above using coaxial cable or siamese cable drop lines.

21 Claims, 12 Drawing Sheets

For use with FIG. 1 Emb.

For use with FIG. 2 Emb.

For use with FIG. 3 Emb.

For use with embodiment of FIG. 4

For use with FIG. 5 embodiment

ACTIVE CABLE MODEM OUTSIDE CUSTOMER PREMISES SERVICING MULTIPLE CUSTOMER PREMISES

BACKGROUND OF THE INVENTION

Digital data and video delivery today via cable TV hybrid fiber coaxial cable systems and cable modems require a cable modem in each customer premises. Typically, the cable from an optical node reaches a passive 8-way tap at a pole or junction box underground near 8 customer sites to be served. Eight drop lines go from this passive tap to eight cable modems in eight different customer premises. Each customer then has to have a cable modem connected to the cable drop line.

This is a more expensive architecture than is necessary because the cable operator must pay for a cable modem for each customer. The prior art architecture also provides access to the cable drop line at the input to the cable modem such that unruly customers or hackers can jam the entire upstream path by injecting a jamming signal directly into the cable drop line.

Therefore, a need has arisen for an architecture which lowers the cost of providing service and removes access to the cable from customer premises.

SUMMARY OF THE INVENTION

The genus of the invention is characterized by: a single shared cable modem on the pole or junction box that replaces the passive tap and services multiple customers; the shared cable modem is coupled to a hybrid fiber coaxial cable TV distribution system that also carries digital data and is coupled to a plurality of subscribers via another shared device and a plurality of drop lines; the shared cable modem extracts data addressed to one of the subscribers that shares the cable modem and transmits it over a LAN link to a shared device that routes it in the proper format to the appropriate subscriber via a drop line coupled to said subscriber. The shared device can be a LAN packet switch or Smart Switch, a DSL concentrator, a voice-over-IP gateway, or a combination of a packet switch and a DSL concentrator or a packet switch and a voice-over-IP gateway.

In species where the shared device is a LAN packet switch, packets addressed to addresses on the LAN of each of the customers the cable modem serves are selected from the stream of data on the cable and routes to the packet switch. The packet switch 71 can be any switch such as an Ethernet switch to implement the switched Ethernet protocol and includes appropriate network interface cards and software drivers to implement this conventional switched Ethernet protocol. In the switched Ethernet protocol, each device on the LANs of the subscribers is given its own virtual channel thereby avoiding the inefficiency of collisions and collision detection of conventional Ethernet. The packet switch 71 also serves as a concentrator for the upstream. The packet switch 71 can also be a Smart Switch in species where class of service guarantees are to be supported, or it can be any other conventional Ethernet packet switch or a packet switch for another type LAN protocol. In this species, each customer has a local area network segment that extends to the packets switch through a diplexer, and the packet switch is located outside the customer premises. The packets received from the cable modem are routed to the appropriate local area network segment extending from each customer premises to the switch. Each local area network drop line is coupled both to the packet switch and the cable input to the cable modem by a diplex filter which mixes high frequency analog CATV video signals with the lower frequency packet data signals at baseband on the LAN segment from the packet switch and transmits the combined signal to the customer premises.

The details of the exact implementation of the shared cable modem are not critical to the invention. Any conventional cable modem technology capable of receiving downstream DOCSIS or other data for a plurality of customers that share the modem and transmitting the upstream data of the same plurality of customers using any form of multiplexing will suffice to practice the invention.

What the subscriber gets at each premises in embodiments where the other shared device besides the cable modem is a packet switch is a downstream video cable upon which she receives analog video CATV signals and a local area network port (LAN port) coupled to a LAN segment coupled to the switch. At the LAN port, the customer receives downstream digital data packets containing digital video data and/or other DOCSIS service data such as broadband internet access, video teleconferencing, distance learning, voice-over-IP telephony service or any one of the other broadband services available. As to upstream, the customer can deliver LAN packets with upstream data to the LAN port and those will be concentrated by the switch onto a LAN segment coupled to the cable modem and modulated by the cable modem onto a DOCSIS or other upstream channel. This is done by processing the data in conventional manner to interleave it, encode with error correction bits, multiplex it using whatever form of time division, code division, frequency division multiplexing or other form of multiplexing that is in use for the upstream (or some combination of the above), and then modulate the upstream packet data onto an upstream carrier using whatever form of upstream modulation is in use. The details of the upstream circuitry, addressing and protocols are not critical, and any conventional circuitry which can perform the function of getting the upstream digital data to the CMTS over the HFC will suffice.

The advantage of the shared cable modem architecture is that the user cannot jam the upstream data channels since the user has no access to the HFC. The user can only jam her own LAN port and the jamming data packets will be discarded at the cable modem and it will continue to function. In the worst case, the jamming packets will simply jam the cable modem since the jamming packets will not be legitimate packets. Thus, in the worst case, only the number of customers serviced by one jammed modem will be affected as opposed to the whole system.

DETAILED DESCRIPTION OF THE PREFERRED EMBODIMENT

Glossary

Figure 1:
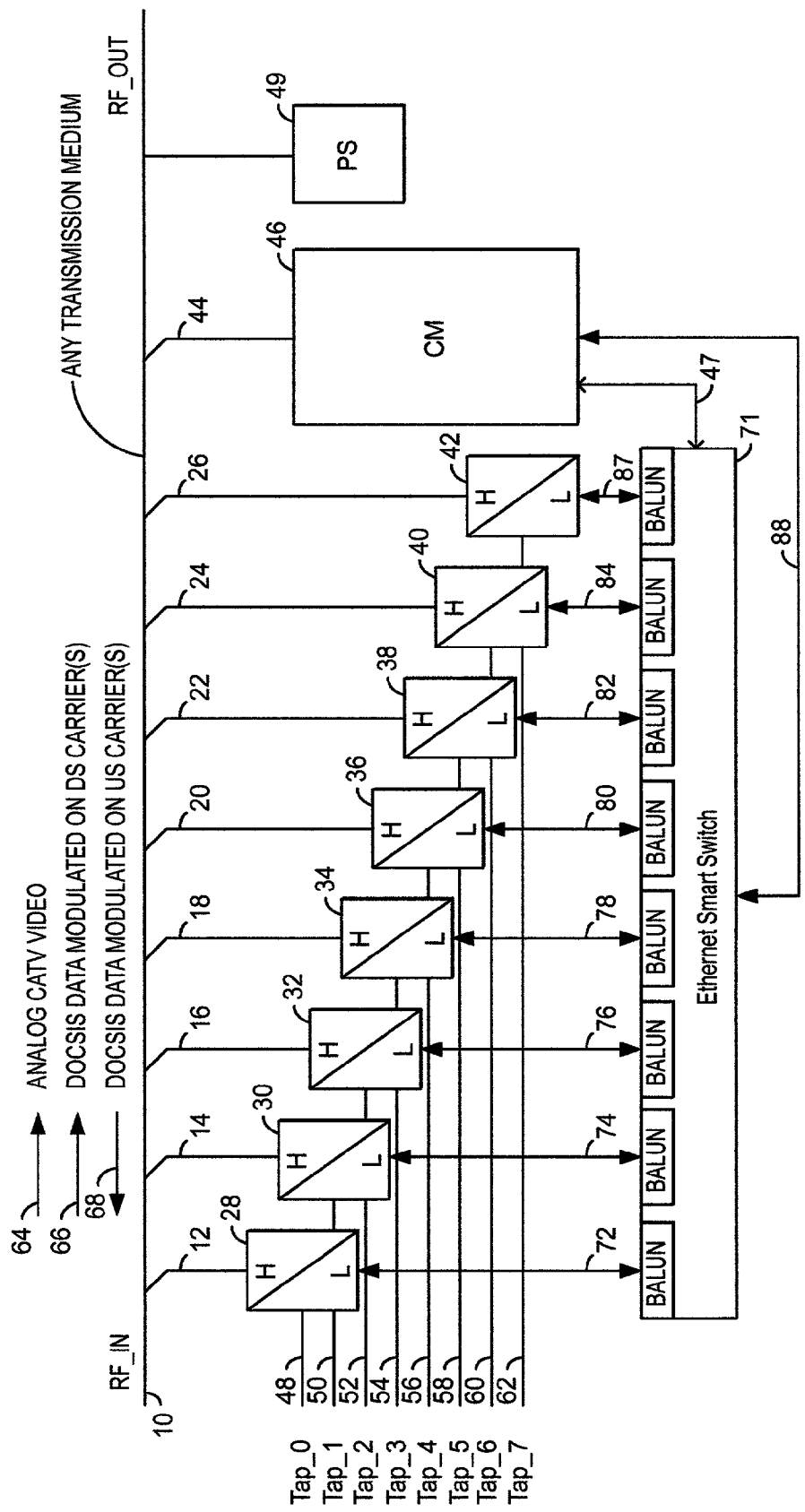
FIG. 1 is a block diagram of one species of the invention using a shared cable modem and a LAN switch to service multiple customers from a location outside the customer premises.

In the claims, the following terms are defined as follows:

1. A shared cable modem (hereafter the modem), in its broadest definition, is a conventional cable modem that has been modified to serve one or more peripherals on the local area networks (hereafter LAN) of a plurality of subscribers and is located outside the premises of each of the subscribers it serves. The shared cable modem must be able to receive downstream signals carrying LAN packets, and/or voice-over-IP packets and/or DSL data packets, select only the packets addressed to subscribers sharing the cable modem and transmit the selected packets to another shared device which may be a packet switch or some type of gateway/router or bridge/router that will transmit the packets to the appropriate subscriber to whom they are addressed in the proper signal format. That signal format can be LAN packet traffic or a conventional DSL signal or a conventional POTS signal. The shared cable modem must also be able to receive upstream LAN packet or other upstream data and transmit it to the headend using whatever media access control and physical layer protocol is in use on the transmission medium between the cable modem and the headend.

Various species within this genus also have one or more of the following characteristics. The modem has an radio frequency (hereafter RF) port for coupling to a shared cable TV signal delivery medium (hereafter HFC) or other transmission medium such as fiber. The modem also has a LAN port which handles bidirectional digital packet traffic to and from all the subscribers which share the modem. Some species use a high speed bus or other data path instead of a LAN segment to communicate with the packet switch and/or DSL concentrator and/or voice-over-IP gateway. In the preferred species, a LAN segment and the LAN port containing a suitable network interface card for the type of LAN in use are used to couple the modem to a shared LAN switch and concentrator. In the preferred species, the packet switch has a 100BaseT or MII input LAN port coupled to the modem and a number of 10BaseT or 10Base2 LAN output ports. Each of these ports is dedicated to carrying packet traffic for one subscriber and is coupled through one of a plurality of diplexer filters to a coaxial cable drop line coupled to the LAN of one of the subscribers that share the switch and modem. The cable modem in most HFC embodiments also has conventional circuitry for demodulation of downstream RF signals received from the HFC on one or more downstream RF carriers and modulating upstream digital data onto one or more upstream RF carrier(s), demultiplexing downstream digital data if downstream multiplexing is used and multiplexing upstream digital data, detection of the symbols transmitted downstream, error detection and correction circuitry to assist in recovery of the symbols from the demodulated signals and recovery of digital packet data encoded in the symbols, and, upstream interleaving circuitry feeding the upstream multiplexing circuitry, and optional Trellis encoding and scrambling circuitry. Each peripheral has its own media access control address, and each subscriber has its own IP address. The cable modem, in the preferred species, receives downstream radio frequency signals which carry downstream digital packet data addressed to various subscribers on the system and recovers the packets of data. The shared cable modem, in the preferred embodiment, has routing tables which list either all the MAC addresses of the switch ports or peripherals on the LANs of subscribers or all the IP addresses of subscribers or peripherals on the LANs it serves or both. The modem uses these routing tables to filter out packets not addressed to the subscribers which share the cable modem. In the preferred embodiment, the modem then routes the packets addressed to its subscribers to a shared LAN switch and concentrator also located outside the premises of the subscribers served by the shared cable modem. Other embodiments of the cable modem transmit all LAN packets, DSL packets and voice-over-IP (VOIP) packets to the shared packet switch, DSL concentrator and/or VOIP gateway for routing to the appropriate subscriber in the appropriate signal format.

2. A cable TV signal delivery medium (hereafter sometimes referred to as the HFC) is typically a hybrid fiber coaxial cable shared transmission medium typically found in most cable TV signal delivery systems. Many alternative terms are used herein to refer to this transmission medium as defined elsewhere, and the intent is to not limit the invention to HFC. The invention is applicable to any transmission medium in a distributed bidirectional digital data delivery system where sharing a modem among multiple subscribers is advantageous.

3. A shared local area network switch and concentrator (hereafter the switch) is a packet switch which is shared by the same subscribers which share the shared cable modem. The switch is coupled to a shared cable modem by a first LAN segment or other data path which is typically a higher speed segment than the LAN segments in the premises of the subscribers. The LAN segment or data path between the switch and modem and the circuitry in switch and modem are nonblocking in the preferred embodiments. The switch receives downstream packets from a shared cable modem that are addressed to particular subscribers and peripherals and/or processes running on the LANs of the various subscribers that share the switch and modem. The switch has one port dedicated to each subscriber which shares the switch. Each port has its own MAC address. The switch then uses its own routing tables to determine from the packet header address data which port to route each downstream packet received from the modem. If a packet is a broadcast packet that is supposed to go to all subscribers, in some embodiments, the switch also acts as a repeater to transmit copies of the packet out all ports to all diplexer filters coupled to all the subscribers who share the switch and modem. In the preferred embodiment, the switch is coupled to each subscriber by a port having a balun and a LAN segment dedicated to that subscriber through a diplexer filter. In other embodiments, the switch is coupled to each subscriber by an HPNA network adapter and a twisted pair, a junction box and the twisted pair portion of a siamese cable dedicated to that subscriber. In some embodiments, the packet switch can be a smart switch to support different classes of service.

4. A diplexer filter is a filter having a high frequency input for coupling to receive high frequency analog CATV signals carried on a cable TV signal delivery medium and having a low frequency LAN input for coupling to a packet data output port of a switch and concentrator and each having a drop cable output for coupling to a coaxial drop cable coupled to and forming part of a local area network of each subscriber. The purpose of the diplexer filter is to filter to select the high frequency downstream analog CATV signals from the cable TV signal delivery medium and filter to select the baseband digital packet data at the LAN input (and block the CATV signals from getting on the LAN segment and block the baseband LAN signals from getting on the HFC) and combine these two types of signals at the drop cable output for delivery to the subscriber via the coaxial cable portion of the drop line to each subscriber. The diplexer high frequency filter has a filter characteristic which prevents any upstream RF carriers carrying upstream digital packet data placed on the HFC by the shared modem from entering the drop cable to the subscriber, and it prevents any high frequency analog CATV signals from getting to the switch.

5. A VOIP Gateway is a gateway that receives voice-over-IP packets from a cable modem each packet being addressed to one of the subscribers who shares the cable modem. The VOIP gateway looks at the address data and routes them to an appropriate subscriber line interface circuit (SLIC) which is dedicated to providing conventional plain old telephone service (POTS) to one subscriber. Each SLIC converts the data to POTS analog signals including appropriate call process tone signals and transmits the POTS signals out on a twisted pair which is coupled through a junction box to the twisted pair portion of a siamese cable coupled to the appropriate subscriber. Upstream POTS signals from each subscriber are converted to VOIP packets and routed by the VOIP gateway to the cable modem for transmission upstream to a headend.

6. A DSL Concentrator is a gateway or routing bridge which converts data encoding DSL signals for the POTS, high speed downstream only and lower speed bidirectional digital data DSL channels from LAN packet or bus traffic format in which it is received from the cable modem into conventional XDSL signals on a twisted pair. The data addressed to each subscriber is routed by the concentrator to an XDSL modem devoted to that subscriber. There it is converted to an XDSL signal and transmitted on a twisted pair which is coupled through a junction box to the twisted pair portion of a siamese cable coupled to the phone lines in the premises of the appropriate subscriber. Upstream XDSL signals from each subscriber are converted by the XDSL modems into upstream DSL packets which are routed by the DSL concentrator to the cable modem.

FIG. 1 is a block diagram of one species of the invention using a shared cable modem and a LAN switch to service multiple customers from a location outside the customer premises. The embodiment of FIG. 1 is useful where a subscriber has CATV service and is out of range of DSL and wants to have broadband data services delivered via the CATV HFC. The embodiment of FIG. 1 has the advantage that there is no need for an active device in the home of the customer. All that is required is the passive circuitry shown in FIG. 6. All the active circuitry on FIG. 1 is on a pole outside the customer premises or underground in a service closet of a cable TV hybrid fiber coaxial cable distribution system (HFC) and replaces the 8-way passive tap and the individual cable modems in each customer site of the prior art. The cable line from the optical node in the HFC system is shown at 10. This cable carries analog CATV video signals and both downstream and upstream DOCSIS or other RF carriers bearing digital data channels on one or more different frequency upstream and downstream carriers. These digital data carriers carry various kinds of data including broadband internet access, digital video, voice-over-IP telephony etc.

Signals bearing digital data such as DOCSIS or other digital data such as voice-over-IP packets, video-on-demand MPEG transport streams, etc. propagate on the transmission medium 10. Typically, medium 10 is the hybrid fiber coaxial cable (HFC) of a CATV analog television signal distribution system, but it could be any medium including a fiber-to-the curb distribution system a satellite digital data delivery service such as DirecPC. In a DirecPC embodiment, the video would be delivered downstream via a DirecTV dish and a shared "settop" digital to analog converter/gateway of conventional design but modified to serve multiple subscribers would be used to feed analog CATV signals to all the diplexer filters or junction box taps shown in FIGS. 1–5 and 11. A separate coaxial cable from the DirecDuo dish carrying the digital DirecPC data is coupled to the shared cable modem in each of the embodiments of FIGS. 1–5 and 11, but the cable modem is modified to be a shared DirectPC modem of conventional design. In the claims, the terms "shared cable modem" or "modem" or "shared cable modem means" or "modem means" or "cable modem means" should be understood to include the above described embodiment where the modem is a shared DirecPC satellite modem. Likewise, the terms used in the claims that refer to the transmission medium that delivers the analog CATV signals and both upstream and downstream digital data should be interpreted to include the above described embodiment. Specifically, these terms should be interpreted to include two separate mediums, one of which includes a shared "settop decoder/gateway" to translate from digital video to analog video and a first coaxial cable to deliver the analog video signals to the diplexer filters or junction boxes and a second coaxial cable that transmits the digital data bidirectionally to and from the DirecDuo dish in DirecPC embodiments with satellite uplinks, and use of POTS telephone lines for upstream digital data delivery for legacy DirecPC installations with no satellite uplink. The term "analog cable TV broadcast signals" is to be interpreted as including analog TV broadcast signals derived by the "shared settop decoder/gateway" from the downstream digital TV broadcasts received at the DirecDuo dish. Everything else is the same.

In the claims, references to cable TV signal delivery or distribution medium or hybrid fiber coaxial cable network or HFC or hybrid fiber coaxial cable CATV signal distribution medium or CATV signal delivery medium or transmission medium are to be understood as referring to any transmission medium of a distributed system in which the notion of sharing a modem and packet switch, DSL concentrator, etc. among multiple subscribers making the system cheaper to implement is a central concept of the design of the system. These signals upstream and downstream logical channels, each with subchannels usually. The signals propagate in both directions, and are tapped by eight taps 12, 14, 16, 18, 21, 22, 24 and 26 and received by diplexer filters 28, 30, 32, 34, 36, 38, 40 and 42. The RF signals propagating in both directions on cable 10 are also tapped by tap 44 coupled to cable modem 46. Tap 44 carries RF signals in both the upstream and downstream direction which encode digital data. In the preferred embodiment, that digital data is DOCSIS format data modulated onto upstream and downstream RF carriers. The downstream RF carriers are modulated with packet data for all subscribers on the system which are recovered by the cable modem, but the cable modem 46 only keeps the packets addressed to the subscribers which share it. The upstream RF signals on tap 44 are, in the preferred embodiment, DOCSIS format data and contain all the LAN packet data from all the subscribers that share the cable modem and which are to be sent to the CMTS. Typically, the LAN packets are encapsulated into DOCSIS format packets or MPEG packets or ATM cells etc. in both the upstream and downstream directions. The exact formatting of the packet traffic, encapsulation and addressing schemes and protocols used on the HFC 10 for bidirectional traffic and how the cable modem filters out packet traffic and routes it to the switch 71 and how the packet switch routes and concentrates packet traffic are not believed to be critical to the invention. The novelty is and the genus of the invention is believed to be in the common characteristic that all species in the genus will have of sharing of a cable modem and a packet switch between multiple subscribers and locating the modem and switch outside the subscriber premises and providing only LAN traffic and analog CATV signals on the coax entering each subscriber's home. Any protocol, packet structure, addressing scheme, filtering and routing scheme and any structure for the cable modem and switch and the diplexers which can accomplish this function will suffice to practice the invention.

The diplexer filters 28 through 42 have a high frequency passband centered on the center frequency of the CATV analog video channels and a bandwidth of the passband which is wide enough to encompass these analog CATV video signals represented by arrow 64. The diplexers reject all RF frequency carriers not in this passband including both upstream and downstream DOCSIS or other carriers bearing digital data, represented by arrows 66 and 68, and pass only the analog CATV video signals to the eight coaxial cable drop lines 48, 50, 52, 54, 56, 58, 60 and 62 that go to eight different customer premises. In the United States, the upstream DOCSIS carriers are in the band from 5 to 42 MHz and the downstream DOCSIS carrier are in the band from 91 to 857 MHz with the analog CATV video signals being in a subband within the DOCSIS downstream band. The DOCSIS downstream carriers are separated in frequency within the 91 to 857 MHz band by frequency so that there is no overlap.

Downstream DOCSIS data modulated onto a downstream carrier(s), represented by arrow 66, is in the format of MPEG packets that encapsulate internet protocol (IP) packets which, in turn, encapsulate LAN packets for the type of LANs the customers of using, usually Ethernet packets. However, the concept of the invention is not dependent on any specific protocol, packet type or frequency plan. The basic idea is for the cable modem 46 to separate out all the packets in the downstream DOCSIS or other digital data addressed to any device or process on the LANs of the customers and send them to the packet switch/concentrator 71 which then routes the packets remaining after the filtration process to the appropriate one of LAN segments 72, 74, 76, 78, 80, 82, 84 and 87.

The cable modem 46 can be any conventional modem which has been modified to have the following functionality: a shared upstream transmitter (or, in the alternative, multiple upstream transmitters each transmitting on a different upstream carrier frequency), said transmitter being capable of carrying out any ranging process to achieve synchronization with the CMTS; a shared downstream receiver per downstream channel (or multiple shared downstream receivers in alternative embodiments); support of multiple MAC addresses in the form of circuitry to recover packet data transmitted on the downstream channels and determine which packets are addressed to one of the subscribers which share the cable modem; one or more bridge routing or filtering tables and associated bridging circuitry that contain address data which can be used to select all the packets addressed to the subscribers that share the cable modem and uses it to select just those packets and bridge from the DOCSIS protocol (or whatever protocol is on the HFC) and the LAN protocol on link 88; shared decryption and/or key management circuitry that can at least decrypt downstream packet data addressed to each of the different subscribers who share the cable modem (key management is defined in the DOCSIS specifications so the required circuitry for a shared DOCSI modem is just an extension of conventional key management circuitry to handle multiple subscribers); and, a shared network interface circuit which takes packet data selected from the downstream which is addressed to any of the subscribers which share the cable modem and drives it onto a LAN segment connecting the cable modem to the packet switch 71. In alternative embodiments, all the above functionality is included in the cable modem, as well as upstream encryption circuitry that can encrypt upstream traffic from all subscribers who share the cable modem and transmit the data to the headend. In still other alternative embodiments, the downstream data such as DOCSIS MPEG transport streams addressed to various users are multiplexed only by their SIDs. This MPEG data is recovered by the cable modem and encapsulated within IP packets which encapsulate LAN packets or is encapsulated in just LAN packets addressed to the proper peripheral of the proper subscriber by mapping the SIDs to the requesting peripheral. The packets are then routed to the peripheral and the peripheral can then strip off the IP packet headers and LAN packet headers and recover the MPEG data and use it to display video-on-demand or perform other services.

Basic circuitry from other patents, publications and pending applications of the assignee may be used to implement the shared cable modem. For example, circuitry from the home gateway disclosed in European Patent Publication EP 1 117 214 A2 (which is hereby incorporated by reference)

may be used to implement the core of the shared modem 46. Specifically, tuner 102 or tuner 104 in FIG. 4A can be used to tune the downstream RF carriers carrying video on demand (VOD) and DOCSIS data. A/D converter 130 digitizes the analog output signal from the tuner. QAM demodulator 146 recovers the constellation points which are then input to a transport demultiplexer 148. This circuit receives control data which tells it which logical channels carry the packets for each service, web page etc. requested by any of the subscribers which share the cable modem and then recovers those packets from the appropriate logical channels and does any necessary demultiplexing. A DOCSIS downstream is typically concatenated packets which are not within specific minislots. Each cable modem receives them all and filters out all but the ones addressed to its subscriber. Some services such as video may be delivered as MPEG streams with one or more Service Identifiers (SIDs) per stream. The transport demultiplexer receives information from the host microprocessor 128 regarding all the SIDs of service data that has been requested from all sources on all LANs of all subscribers who share the cable modem and all the IP or MAC addresses of subscribers who shared the cable modem. The transport demultiplexer then recovers for transmission to an IP video circuit 158 and conditional access circuit 126 only those packets addressed to and MPEG streams having one or more SIDs requested by subscribers sharing the cable modem. With unshared DOCSIS modems, typically each subscriber has 16 SIDs. With the shared cable modem, the total number of SIDs it must be able to deal with is the number of the subscribers times the number of SIDs per subscriber. The transport demultiplexer functions to recover those MPEG streams having the designated SIDs as well recover other data packets multiplexed onto other logical channels for other services. Conditional access circuit 126 decrypts the recovered packet data for all the subscribers. The output of the conditional access circuit is a plurality of packets addressed to a particular address on the LAN of the subscriber who ordered the data or to which the CMTS wants to send data. How this addressing is structured is not critical. One way is to have a LAN packet such as an Ethernet packet addressed to the destination address owned by the process or peripheral to which the data is to be sent. That Ethernet packet is encapsulated in an IP packet or an MPEG packet which is addressed to an IP or MAC layer address mapped to the particular subscriber or the port on the switch 71 coupled to the subscriber. Another way is to have a LAN packet such as an Ethernet packet which encapsulates an IP packet itself encapsulated into whatever packet structure is used on the HFC 10 such as an MPEG packet. The MPEG packet header is stripped off in circuitry in the cable modem such as the IP video circuit 158 in FIG. 4A of the EPO publication incorporated by reference herein. The LAN packet is then used to get the packet to the right switch port and the right subscriber LAN. The NIC of the computer to which the LAN packet is addressed then strips off the LAN packet header, and the IP packet header address and port information get the data to the correct process to which the data is addressed. In some alternative embodiments, the MPEG packet encapsulates only an IP packet, and the IP video circuit then encapsulates the IP packet into a LAN packet using the IP addresses in the IP packet header and its routing table. The IP destination address in this embodiment is mapped in the routing tables to the particular LAN physical layer address in the LAN packet header. This embodiment is useful where the routing process in the cable modem works on IP addresses. In other embodiments, the IP video circuit 158 can simply strip off whatever packet header information encapsulates the LAN packet after doing error correction using the error correction bits of the encapsulating packet. The resulting LAN packet is addressed to a routing process which can use the LAN packet destination address to route the packet.

Any addressing and packet encapsulation scheme that gets each packet where it is supposed to go will suffice to practice the invention.

The packets output by the IP video circuit 158 are then passed to a router/interface circuit 86 which routes them to switch 71 via 100BaseT data path 20. In alternative embodiments, the router 86 could be coupled to the switch 71 in FIGS. 1 or 2 by a USB connection or a 10BaseT LAN link. In other alternative embodiments, the router 86 could route packets addressed to the different subscribers directly to the appropriate diplexer through multiple network interface cards and multiple LAN links thereby eliminating switch 71 altogether. This prevents supporting DOCSIS 1.1 or other protocols which provide guaranteed classes of service unless the circuitry and software of an Ethernet Smart Switch is incorporated into the cable modem to drive 8 separate ports.

Router 86 has routing tables in it which contain the addresses needed to route packets to all the subscribers which share the cable modem.

Upstream data from all the subscribers that share the cable modem arrives from the switch on 100BaseT link 20 in FIG. 4A of the EPO publication and is routed by router 86 via path 118 to a DOCSIS modem 70. This DOCSIS modem multiplexes the different data from different subscribers and different sources on the LANs of each subscriber using time division multiplexing (TDMA) in some embodiments. In other embodiments, the DOCSIS modem 70 is more advanced and can use either TDMA or synchronous code division multiplexing (SCDMA). In still other embodiments, the DOCSIS modem can use TDMA or SCDMA or synchronous TDMA (STDMA). In still other embodiments, there is one DOCSIS modem for each subscriber and each DOCSIS modem can be any one of the various types identified above. In these multiple DOCSIS modem embodiments, router 86 routes the packets from each subscriber to a different DOCSIS modem with the modem multiplexing the upstream data from the different sources on the LAN of its subscriber. In other alternative embodiments, any of the above embodiments may be used with any other type of cable modem substituted for a DOCSIS modem. The DOCSIS modem or modems 70 are controlled by downstream messages from the CMTS and the host microprocessor 128 to perform ranging and upstream equalization training. The modem or modems also send upstream messages to request bandwidth and receive downstream bandwidth allocation messages addressed to the modem or host microprocessor. The modems then transmit the upstream data during the allocated minslots and/or using the allocated timeslots and/or allocated spreading codes to keep the data from different subscribers separate and to keep data from different sources on the LAN of each subscriber separate.

Returning to the discussion of FIG. 1, since the LAN packet data selected by the cable modem and sent to the switch 71 is at baseband (no carrier), it passes through the lowpass filter of the diplexers 28, 30, 32, 34, 36, 38, 40 and 42 and is mixed by superposition onto the eight coax tap lines 48 through 62 and propagates to the customer's coaxial cable LAN/CATV distribution network along with the CATV analog video signals.

The packet switch can be any switch that can receive packets on a LAN segment from the cable modem and use routing tables to route the packets addressed to each subscriber to the proper output port coupled to that subscriber. The packet switch should also be able to receive upstream LAN packet data, recognize the IP addresses in that packet data as coming from one of the subscribers which share the switch and concentrate all the packet data from all the subscribers for driving onto a LAN segment 88, bus or other data path (hereafter referred to as either a LAN segment or data path) that couples the packet switch to the cable modem. The packet switch 71 in the preferred embodiment, is an Ethernet Smart Switch which acts as a router between 10BaseT LAN segments 72 through 86 and the cable modem 46 which outputs a stream of data packet on 100BaseT or MII parallel LAN segment 88. Use of a Smart Switch is only necessary where DOCSIS 1.1 and other protocols with guaranteed classes of service are to be supported. In some embodiments, the switch 71 can be eliminated and the cable modem 46 can have a separate LAN port for each subscriber. In this embodiment, the cable modem has a built in router which routes each packet having an IP address matching that of one of the peripherals on one of the LANs of one of the subscribers to the proper LAN port on the cable modem. These LAN ports are then coupled directly by LAN segments from the cable modem to the appropriate one of the diplexer filters.

In the preferred embodiment, the switch 71 has a learning bridge and routing table per port to help the shared modem see the ports and learn the addresses behind each port. In other words, in the preferred embodiment, each port of the switch learns the addresses on the LAN of the subscriber coupled to that port by examining the source and destination addresses of traffic passing through the port. Routing tables are built from this data which can be uploaded into the cable modem in some embodiments for use there in filtering out packets not addressed to any of the IP addresses on the LANs of the subscribers that share the modem. In alternative embodiments, the cable modem can learn the addresses on each subscriber LAN by watching the header addresses in LAN packets recovered by the modem that are routed to each port. In the preferred embodiment, a control link 47 between the cable modem and the switch 71 is used by the modem to program the MAC addresses of the ports, upload address information from the routing tables of each port and carry out any other control functions necessary to implement the functions described herein. In alternative embodiments, the routing tables of the switch and the filtering and/or routing tables in the modem can be manually configured upon installation.

The switch 71, in the preferred embodiment, also has circuitry to implement the following functionality: concentration of upstream packet traffic received from the subscribers who share the cable modem and driving these packets onto LAN segment 88; use of nonblocking switching circuitry that has sufficient buffering, bandwidth and which prevents bottlenecks (aggregate traffic in volume less that aggregate traffic out volume) so it appears to each subscriber that the cable modem is not being shared; perform regular LAN collision detection and implement all the regular LAN stuff like error detection and correction and protocol rules for media access control and physical layer protocols for each port; perform downstream routing of packets received from cable modem to the appropriate switch port coupled to the LAN of the subscriber to whom the packets are addressed; and, provide isolation between the different ports, i.e., no packets can be sent locally from one subscriber to another. Any circuitry that can perform these tasks can be used. The switch 71 can be the combination of a switch and a concentrator or simply a switch that switches all upstream packets received on the ports without examining the addresses to link 88 and routes downstream packets. Each subscriber has an IP address and a media access control (MAC) address. The IP address typically maps to or is part of a MAC address. The MAC address typically is or includes a switch port address on switch 71 in FIG. 1 and, in some embodiments, also includes one or more Ethernet or other LAN physical layer addresses. Because typically there are only 8 ports on the switch, each coupled to a 10BaseT LAN link and the LAN link 88 to the cable modem is 100BaseT, the switch will be nonblocking since the bandwidth of line 88 is sufficient to carry 10 megabit/second traffic from each of the eight ports simultaneously within the meaning of the collision sense Ethernet protocol.

In some embodiments, the switch and the cable modem have learning capability to built the routing tables therein. This can be done by watching the IP addresses that are in upstream packets that arrive at each port from each subscriber. In other alternative embodiments, the routing tables can be built manually upon installation. This has the disadvantage that when new devices are added to the LAN of any subscriber, that device will not be in the routing tables.

The cable modem receiver filters out all frequencies other than the desired DOCSIS downstream carrier or carriers carrying digital data requested by or addressed to peripherals or processes on the customer LANs (hereafter just referred to as user processes). The cable modem typically receives downstream management and control messages that tell it which downstream carriers carry data requested by or addressed to a user process at one of the sites served by the cable modem. The cable modem then digitizes the filtered signals from the tuner or tuners and digitally demodulates the digital data to recover the transmitted data in the MPEG transport streams or from whatever other logical channels are used. A transport demultiplexer in the cable modem then recovers the transmitted video/audio/related data complexes of digital video or other data such as broadband internet access from the subchannels on which each component was transmitted. The MPEG headers are then stripped off, and any packets having IP addresses addressed to a user process or peripheral of the one of the subscribers that shares the cable modem are kept and all others are discarded. A conditional access decryption process then decrypts the data portions of the recovered data packets using the appropriate encryption keys of the customers being served to which each packet is addressed. The MPEG and IP and LAN packet header data is not encrypted. For unencrypted downstream data portions, the cable modem 46 simply recovers the packets from the received signals and strips off the MPEG headers and compares the IP addresses to the IP addresses of the user processes. Any packets addressed to a user process are kept and all other packets are discarded. The kept packets are then forwarded to a network interface card in the cable modem for transmission to switch 71.

A power supply 49 powers the cable modem and switch. This power supply can take one or more forms. It can be a straight battery. It can be a battery with a solar power trickle charger. It can extract power from a signal on the HFC with a solar trickle charged backup battery. In another embodiment, the power supply can be a smart supply which derives its power from the HFC if power is available, and, if not, gets the needed power from an array of solar panels if the sun is shining, and, if not, derives the necessary power from batteries which are then recharged from the solar panels when the sun starts shining. In the broadest embodiment, the power supply just gets power from somewhere and it is not important where as long as power can be derived from the source.

Figure 6:
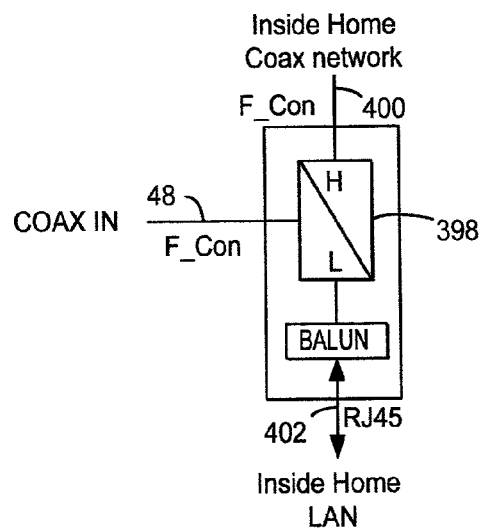
FIG. 6 is a block diagram of the circuitry inside each subscriber premises which cooperates with the active shared circuitry of FIG. 1 to provide analog video and LAN data service to each subscriber.

The circuitry needed inside each subscriber premises to support the circuitry of FIG. 1 is shown in FIG. 6. All that is needed is another diplexer filter 398 to separate the high frequency analog video signals on coax drop line 48 from the baseband LAN signals. The high frequency analog CATV signals are output on the home's existing coaxial cable CATV distribution network 400. The baseband LAN signals are output on an LAN medium 402.

Figure 2:
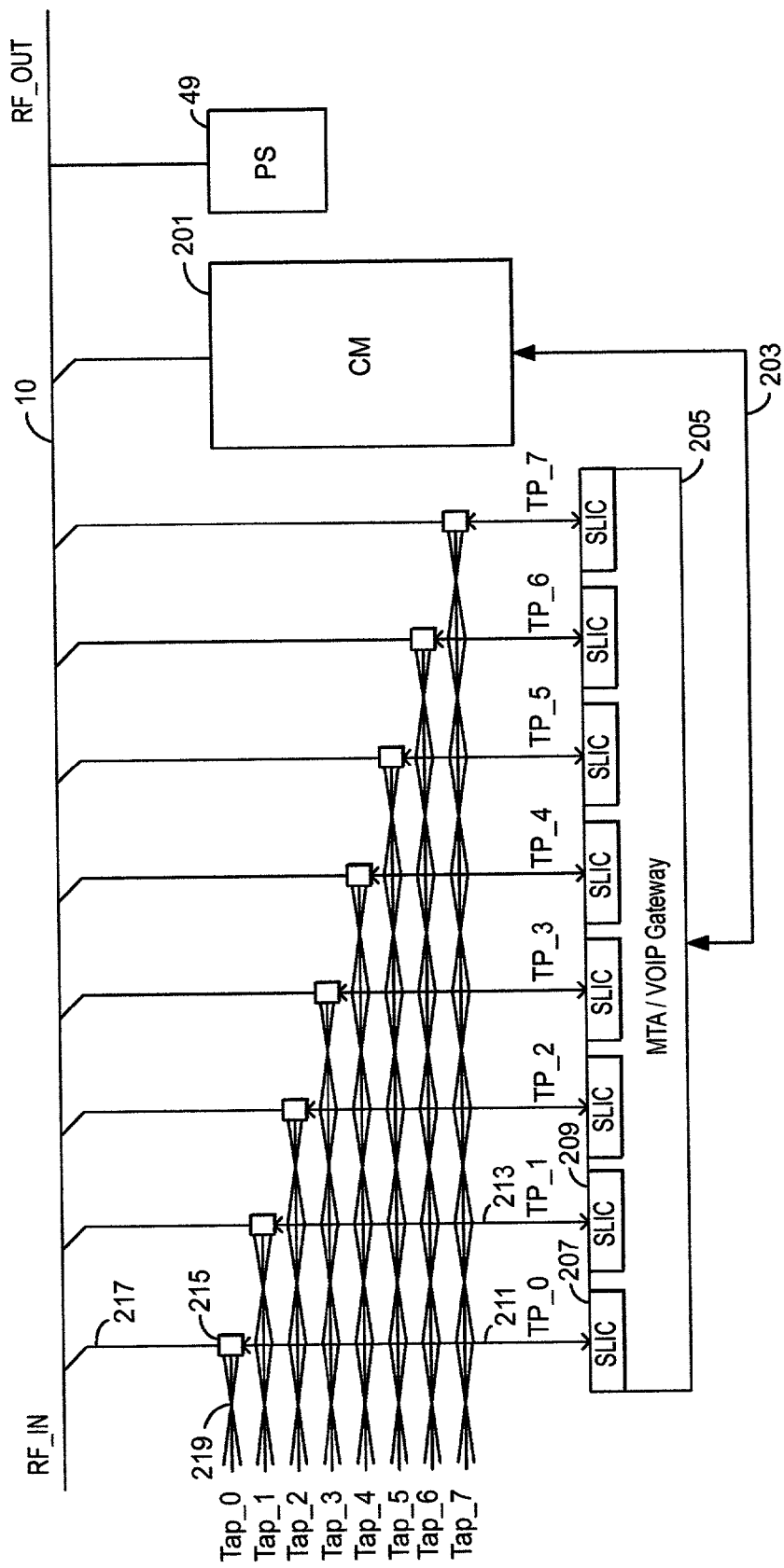
FIG. 2 is a block diagram of a system to use a shared cable modem to implement voice-over-IP telephony to multiple subscribers.

Referring to FIG. 2, there is shown a block diagram of a system to use a shared cable modem to implement voice-over-IP telephony to multiple subscribers. The embodiment of FIG. 2 is useful where a subscriber has CATV and phone service and wants to add an additional phone line via VOIP digital service, or has CATV service but no phone service and wants to add phone service. In this embodiment, a cable modem 201 receives voice-over-IP (VOIP) packets from downstream VOIP channels on HFC 10. Various VOIP packets are received, and these can be addressed to any subscriber(s) on the system. The cable modem rejects all but the packets addressed to the subscribers that share the cable modem. The cable modem then routes these IP packets over a LAN link or bus 203 to a voice-over-IP gateway. LAN link or other bus 203 has sufficient bandwidth and a protocol so as to not block the free flow of voice encapsulating LAN traffic for any of the subscribers that share cable modem 201 in either the upstream or downstream directions. Data path 203 can be any high speed data path or bus and use any protocol such as 100BaseT or fast Ethernet, MII, Iso-Ethernet, 100VG-any LAN, FDDI, ATM, USB, Firewire, SCSI, etc. Various digital data communication technologies, protocols including media access control protocols and other useful information to implement the teachings herein are taught in Horak and Miller, *Communications Systems and Networks: Voice, Data and Broadband Technologies* (1997) M&T Books, Foster City, Calif., ISBN 1-55851-485-6, which is hereby incorporated by reference.

The downstream voice-over-IP packets are routed by the voice-over-IP gateway (VOIP gateway) 205 to the proper one of a plurality of subscriber line interface circuits (SLICs) of which 207 and 209 are typical.

The VOIP gateway and SLICs strip off the IP packet headers and uses the payload data to generate analog voice signals and call progress tone analog signals. Each SLIC is coupled to a twisted pair conventional tip and ring phone line of which 211 and 213 are typical. The analog call progress tones generated by the VOIP gateway and a subscriber line interface circuit (SLIC) are coupled to the twisted pair of the appropriate subscriber. Twisted pair 211 and 213, as well as the rest of the twisted pairs, are coupled at junction boxes to the appropriate twisted pair drop line portions of siamese cable drop lines coupled to the phones in each subscriber's home or business. In other words, SLIC 207 is coupled by twisted pair 211 to junction box 215. This junction box is also coupled to a coax tap line 217 which is coupled to the HFC 10 and carries downstream analog CATV signals. Junction box 215 is also coupled to one of the subscriber premises by a siamese cable 219 which has two separate signal paths: a coaxial cable signal path, and a twisted pair telephone line that is wound around the coax. At junction box 215, twisted pair 211 is coupled to the twisted pair of siamese cable 219, and coax 217 is coupled to the coax of siamese cable 219. Thus, the downstream analog CATV signals are coupled onto the coax of the siamese and the analog "plain old telephone service" (the conventional analog telephone signals that existed before DSL hereafter referred to as POTS) telephone signals are coupled onto the twisted pair portion of the siamese cable. This is repeated at each junction box for each subscriber.

The call progress tones are used to give audible indications to the user via his telephone about the progress of his call. They include dial tone, busy signal, ring tone, equipment busy, call waiting, etc. Some of these call progress tones such as ring tone, equipment busy and call waiting are generated from data received from a voice-over-IP gateway at the headend that receives analog signals received back from the central office (CO) and converts them or encodes them as special codes which say which call progress tone to generate in the SLIC coupled to the subscriber. These codes or actual data are encapsulated in IP packets and sent to the cable modem. In other words, when a call is connected to the called phone through the PSTN, and the called phone is rung, the CO sends a ring back tone as an analog signal (or packet data on a T1 or partial T1 digital connection) to the VOIP gateway at the CMTS. The VOIP gateway at the CMTS encapsulates appropriate data to indicate ringing is happening and addresses it to a tone generation process in the VOIP gateway 205 or addresses the data packets to an IP address associated with a SLIC coupled to the phone of a subscriber who placed the call. The tone generation process or SLIC then generates an analog ring tone and puts it on the twisted pair coupled to the subscriber's phone.

The cable modem 201 in FIG. 2 has the same structure as the cable modem 46 in FIG. 1 except that key management for video decryption is not necessary in embodiments where the cable modem handles only telephony packets although key management circuits may be present in embodiments of the cable modem which handle video telephone conference data. The cable modem 201 recovers the downstream voice-over-IP packets from whatever logical channels they are sent upon and routes them to the VOIP gateway 205. In some embodiments, the cable modem includes echo cancellation circuitry and may also include HDSL circuitry to transmit PCM upstream data using HDSL frame timing, clock recovery and synchronization protocols on one or more logical channels in the upstream, and to receive downstream PCM voice data using HDSL protocols and encapsulate that data into LAN packets for transmission on link 203. In other embodiments, data path 203 can be a USB or firewire connection or any other data path and associated transceivers having sufficiently high bandwidth to handle the data volume of however many subscribers share the VOIP gateway and modem.

Typically, a single logical channel is used in the downstream to transmit VOIP packets to each subscriber and another logical channel is used in the upstream to transmit VOIP packets from each subscriber. The logical channels in the downstream can take any form such as separate frequencies, separate timeslots or separate spreading codes or separate MPEG streams or simply be concatenated packets with the destination address of each packet defining its logical channel and being the IP address of the subscriber to which the VOIP data packet is directed. The logical channels in the upstream can be multiplexed by any of the above methods or can be transmitted in minislots or timeslots assigned by the CMTS for each subscriber as the need arises such as in DOCSIS or similar systems.

The function of each SLIC 207, 209, etc. in the VOIP gateway 205 (also known as a media terminal adapter) is to receive VOIP digital data packets routed to the SLIC by the rest of the gateway circuitry, and convert the data in the channel packets back to analog signal form and couple the analog signals for each channel onto a twisted pair dedicated to that channel which couples the SLIC to the subscriber. The SLICs also receive upstream analog signals and digitize them, usually into PCM data, and sends the digital data to a packetizing and routing process which packetizes the data into a properly addressed IP packet and routes it via LAN link 203 to the cable modem 201. In alternative embodiments where data path 203 is a USB or other type bus, the gateway carries out appropriate processing to transmit the data to the cable modem using the bus protocol and the cable modem packetizes the data or performs appropriate processing to send the data in unpacketized form during assigned minislots or an assigned logical channel to the CMTS. The CMTS then routes it to the appropriate SLIC coupled to a line from the central office where the data is converted back to analog telephony signals and sent to the CO.

Figure 7:
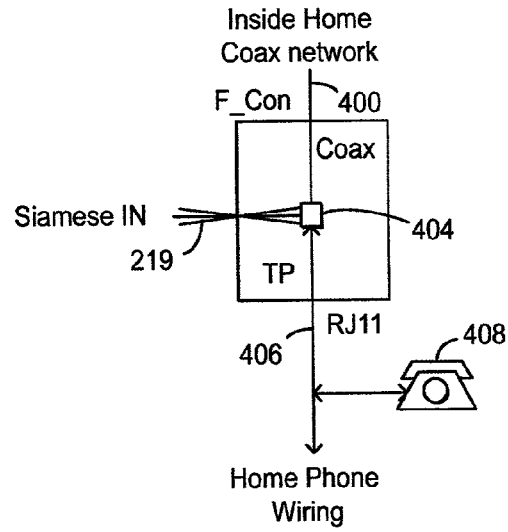
FIG. 7 is a diagram of the passive circuitry inside every subscriber's premises that cooperates with the embodiment of FIG. 2 to provide analog CATV video and conventional POTS telephone service.

Referring to FIG. 7, the passive circuitry inside every subscriber's premises that cooperates with the embodiment of FIG. 2 is shown which provide analog CATV video and conventional POTS telephone service. The siamese cable input 219 from the shared circuitry outside the customer premises is coupled to a junction box 404. There, the coaxial cable is split out or coupled to the existing home CATV coaxial cable distribution network. The twisted pair portion of the siamese cable bearing POTS analog telephony signals is coupled through an RJ11 jack to the home's existing twisted pair phone distribution network 406 for coupling to conventional POTS telephone 408.

Figure 3:
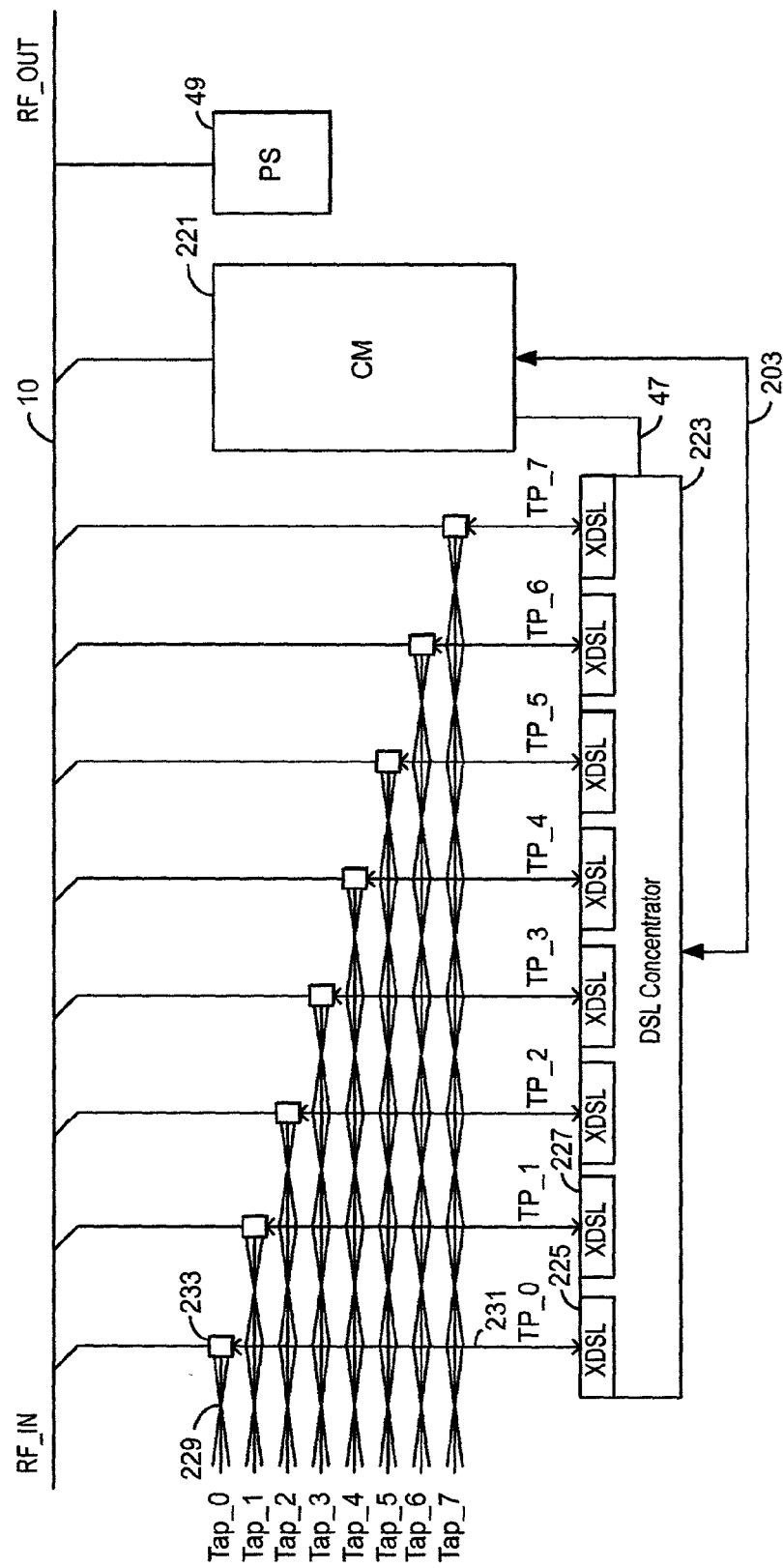
FIG. 3 is a block diagram of a species of the invention using a shared DSL concentrator and shared cable modem which has the advantage of extending DSL technology beyond its current distance limits.

The problem with the embodiment of FIG. 2 is that it provides only one phone line per subscriber. This can be remedied by substituting a DSL concentrator for the VOIP gateway 205, as shown in FIG. 3. The advantage of the embodiment of FIG. 3 is that customers who have CATV and possibly POTS phone service can add broadband digital data services such as video-on-demand and one or more additional phone lines one of which is POTS and the other of which are digital.

Referring to FIG. 3, a species of the invention using a shared DSL concentrator and shared cable modem is shown which has the advantage of extending DSL technology beyond its current distance limits. ADSL, IDSL, RADSL, SDSL, HDSL and VDSL carry, in addition to analog plain old telephony (POTS) signals over a separate analog channel, a high speed digital downstream only channel as well as a lower speed bidirectional digital channel, at various speeds depending upon the technology. In conventional ADSL, a 1.544 to 6.144 Mbps downstream digital channel is provided to the customer at a maximum distance of 3 kilometers from the CO. Higher speed downstream channels require even less distance to the CO. For example, a 155 Mbps downstream channel can only support customers less than 500 meters from the CO. The bidirectional DSL channel provides from 16 to 640 Kbps. This is enough bandwidth to support multimedia video, audio and graphics and text data transmissions to the customer. Conventional ADSL carves up the available spectrum into several independent channels suitable for any combination of services such as broadband internet access, video-on-demand, interactive gaming, voice, ISDN etc.

At the central office of conventional DSL systems, voice, data and image information typically arrive across a WAN via an ATM backbone network or a satellite downlink, and video MPEG data may also be generated by a video server at the CO. Analog POTS voice signals are handled at the CO via a splitter which ensures that the POTS signals are not affected by the presence or absence of digital signals. In a normal DSL system, the video and broadband data signals are time division multiplexed into an analog ADSL signal.

These DSL distance limitations are eliminated by the embodiment of FIG. 3 because the high speed digital data is not converted to a DSL signal until it reaches the DSL concentrator which is always located close enough to the customers to support very high bandwidth DSL transmissions over the short twisted pair connection from the DSL concentrator to the customer. As long as the customer is connected to a cable TV system, she can receive high speed DSL. The long distances from the CO to shared cable modem are covered by transmission of the DSL analog and high speed downstream digital and lower speed bidirectional digital data over a very high bandwidth HFC system. The CMTS may be coupled to the DSL CO by a high speed WAN or dedicated T1 or better line to convey the digital and possibly digitized POTS data.

In the embodiment shown in FIG. 3, the POTS voice signals are digitized into voice-over-IP packets either at the CO or the CMTS and sent downstream by the CMTS on a first logical channel. The DSL highspeed downstream digital channel data is encapsulated at the CMTS into packets or cells addressed to the subscriber to whom the data is to be sent and broadcast or placed on logical channels temporarily assigned by the CMTS for the transmission. This can be done by encapsulating the DSL high speed downstream channel data into MPEG packets, ATM cells or LAN packets or IP packets or some combination of the above (encapsulating a packet into a different kind of packet or cell) and transmitted the resulting packet data to the cable modem on one or more downstream logical channels. If enough logical channels are available to service all subscribers, downstream logical channels dedicated to particular subscribers can be used. In this embodiment, packetization at the CMTS could be eliminated (because there is no need for addressing) so that payload data is just transmitted in chunks with appended error correction bits on the logical channel or channels assigned to the particular subscriber to whom the data is to be sent.

The same holds true for the data of the lower speed bidirectional channel. For the downstream, the lower speed data can be transmitted on temporarily assigned logical channels as packet data or transmitted not as packets on dedicated channels. The upstream lower speed data can be packetized and transmitted on logical channels temporarily assigned by the CMTS or packetization can be omitted if dedicated channels to each subscriber are used.

In the preferred embodiment, cable modem 221 receives downstream DSL data for the three channels (POTS, high speed downstream only and downstream portion of lower speed bidirectional channel) encapsulated in voice-over-IP packets. In alternative embodiments, the DSL digitized POTS and high speed downstream and downstream portion of lower speed bidirectional channel as data is encapsulated in ATM cells, MPEG transport streams, LAN packets etc. Each packet, cell or transport stream will have some sort of identifier to indicate which DSL service channel it came from and another identifier which indicates which service it provides, e.g., video-on-demand, POTS telephone call, broadband internet access, interactive game data etc.

The cable modem receives these downstream broadcasts or logical channel transmissions, and selects from them only the packets, cells or MPEG transport streams addressed to any subscriber sharing the modem 221. More specifically, each twisted pair from the DSL concentrator will be coupled to a DSL modem in the customer premises. That modem will have a POTS telephone plug that the subscriber's telephone can plug into and a LAN output coupled to a plurality of peripherals such as computers and other digital devices. Each computer or device coupled to the LAN will have an IP address, and each process running on the computer or device will have a separate port address. The IP packets containing the DSL digital data will have IP addresses in the headers to get to them to the right computer or peripheral on the LAN and port identifier data in the header which identifies to which particular process on the computer or device the data is to be directed.

As is the case with all embodiments disclosed herein, the addressing/modem filtering scheme can be anything that gets the job done and is not critical to the invention. The invention in FIG. 3 is using HFC and a shared cable modem and shared DSL concentrator to extend the range of DSL. The addressing/filtering scheme may be as simple as recovering all packets transmitted on a particular downstream logical channel assigned to a particular customer and routing them over data path 203 to a DSL concentrator 223. All remaining packets not addressed to one of the subscribers are either not recovered or are recovered and flushed. Another addressing scheme in DOCSIS systems is for all DSL data to be encapsulated into some sort of packet with an address and concatenated in a broadcast downstream. Each shared cable modem then receives all packets in the broadcast and filters out all but ones addressed to the subscribers which share the modem 221.

All recovered packets are sent from the cable modem 221 to the DSL concentrator 223 via data link 203 which can be a high speed USB or Firewire, SCSI bus or any high speed LAN link. The DSL concentrator then routes the various packets to the appropriate XDSL modem (where XDSL means any type of DSL modem generating the correspond type of DSL signal) of which 225 and 227 are typical and formats the data into the format the XDSL modem is expecting. DSL modems that are integrated on commercially available integrated circuits are available now and multiple DSL modems on a single chip are available. If the XDSL modem is expecting Ethernet packets or Ethernet packets encapsulated in IP packets for the high speed downstream digital channel and analog POTS signals for the conventional telephony, the DSL concentrator converts the incoming data from link 203 from whatever format it is in to the format expected by the XDSL modem and routes the data and signals to the correct XDSL modem. The XDSL modems convert the digital packet data and analog POTS signals into a DSL signal of the appropriate ADSL, SDSL, HDSL, etc. format and launches the signal onto the twisted pair coupled to the DSL modem. For example, the data packets addressed to the subscriber coupled to drop line 229 (a siamese cable) is converted by XDSL modem 225 to a DSL analog signal and placed on twisted pair 231 where it propagates to junction box 233. At junction box 223, the DSL signal on twisted pair 231 is coupled onto the twisted pair portion of siamese drop line 229. At junction box 233, the analog CATV signals in the downstream of the HFC 10 are coupled onto the coaxial cable portion of siamese drop line 229 and propagate to the customer's settop decoders or TVs.

The term XDSL modem means any Asymmetric Digital Subscriber Line (ADSL) or High Bit Rate Digital Subscriber Line (HDSL) modem. The DSL upstream digital data and POTS signals are converted by a DSL modem in each customer premises to a DSL signal and transmitted over the twisted portion of drop line 229 and twisted pair 231 to XDSL modem 225. There they are converted by the XDSL modem and DSL concentrator to whatever digital format in which they will be routed over data path 203 to the cable modem 221. This format may be the same or different digital format in which these signals are transmitted over the HFC. If the upstream data on data path 203 is in a different format than will be used to transmit upstream data on the HFC 10, then cable modem 221 converts the data to the proper packetized or other format used to transmit the data on temporarily assigned or dedicated upstream logical channels and implements the upstream MAC and whatever other upstream protocols that are used to transmit data upstream to the CMTS on HFC 10. Any protocols and any data packetization or lack of packetization and any addressing or dedicated logical channel schemes may be used in the upstream since the important thing about the invention is that the DSL data be sent not over twisted pair the long distance to the CO but over high bandwidth HFC thereby eliminating the distance limitations.

Figure 8:
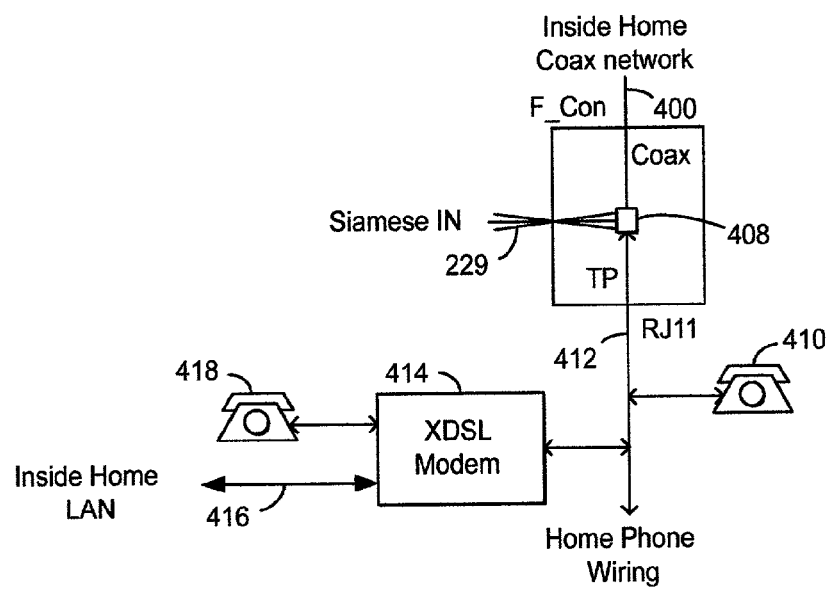
FIG. 8 shows the circuitry inside the customer's home to support the shared circuitry outside the home shown in FIG. 3.

FIG. 8 shows the circuitry needed inside the customer's home to support the shared circuitry outside the home shown in FIG. 3. In FIG. 8, the siamese cable drop line from the shared circuitry is coupled to a junction box where the coaxial cable portion is split out or coupled to the existing coax CATV distribution system 400. At the junction box, the twisted pair portion of cable 229 is coupled to the home's existing twisted pair phone POTS distribution system 412. A conventional phone 410 is coupled to 412 and receives the POTS analog signals from the POTS portion of the spectrum output by the XDSL modems. The twisted pair 412 is also coupled to a DSL modem 414 which extracts the downstream digital data in the high speed DSL signal on 412 and outputs it as LAN packets on a customer LAN 416 to whatever computers or other digital peripherals the customer has. DSL modem 414 also recovers the downstream data in the lower speed DSL bidirectional channel and outputs it as LAN packets on LAN #2. Upstream packets are received by DSL modem 414 from LAN #2 and converted to DSL signals for transmission over the siamese cable twisted pair portion to the appropriate XDSL modem of DSL concentrator 102. Another conventional POTS phone 418 is coupled to the DSL modem.

Figure 4:
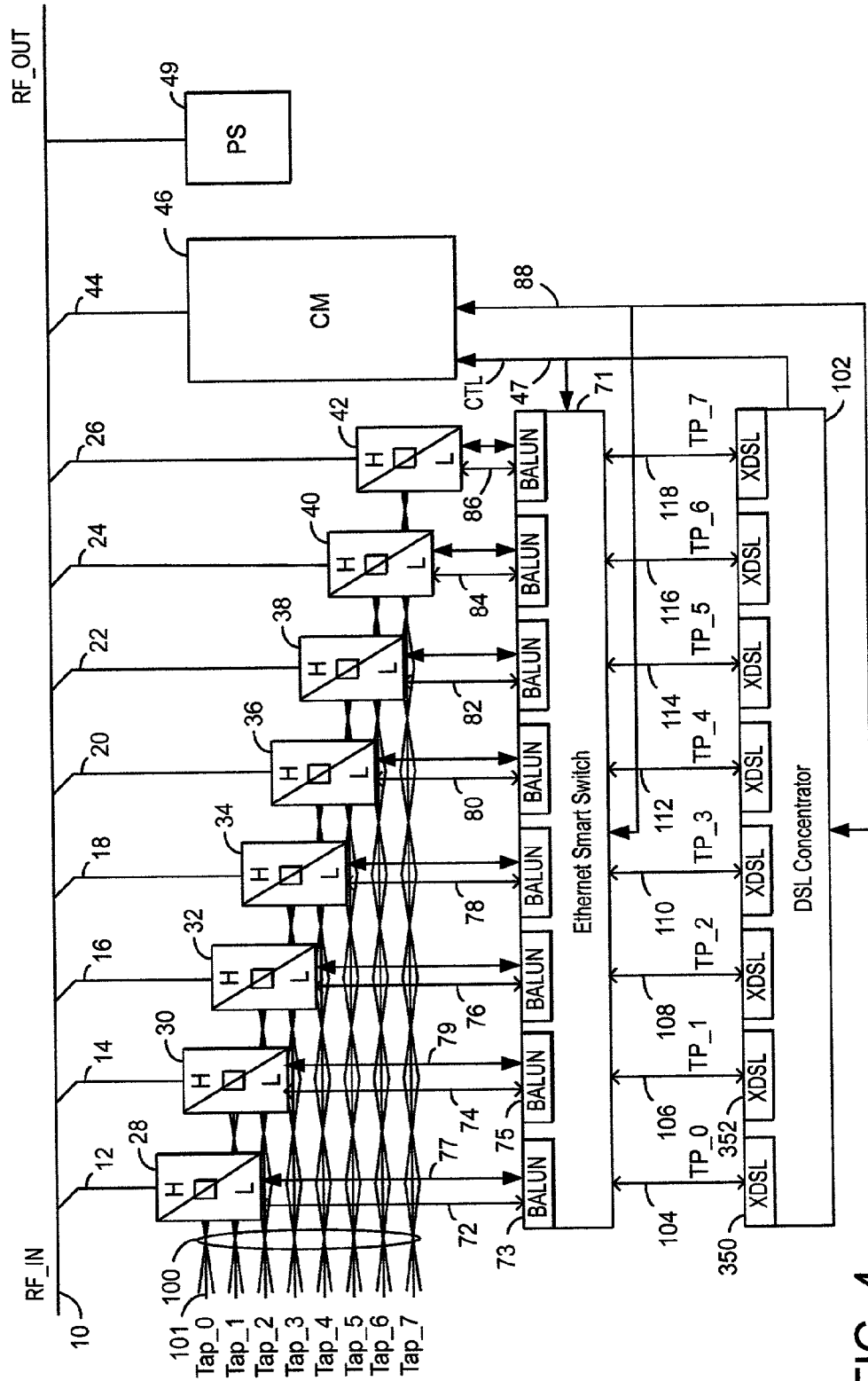
FIG. 4 is a block diagram of another embodiment of the invention wherein a DSL concentrator and a packet switch are used for providing telephony and broadband DSL digital data services as well as DOCSIS or other broadband bidirectional digital data transmission over HFC 10.

Referring to FIG. 4, there is shown a block diagram of another embodiment of the invention wherein a DSL concentrator and a packet switch are used for providing telephony and broadband DSL digital data services as well as DOCSIS or other broadband bidirectional digital data transmission over HFC 10. The embodiment of FIG. 4 is useful where a customer has CATV service and maybe POTS telephone service and wants to add broadband digital data services and additional phone lines via the DSL and additional broadband digital data services which are particular well adapted to DSL delivery. For example, certain digital data services can be delivered by the packet switch and other digital data services more well suited to the DSL medium and additional phone line services can be delivered by the DSL concentrator.

A difference of the embodiment of FIG. 4 over the embodiment of FIG. 1 is that the drop cables 100 to the subscribers that share the modem 46 are coaxial cables with twisted pair telephone lines wrapped around them and are referred to herein as siamese cables. The twisted pair carries DSL analog signals bearing both POTS and broadband downstream data and bidirectional slower speed upstream and downstream data. The coaxial cable portion of each siamese drop line 100 carries downstream only analog CATV signals as well as LAN packet traffic bearing DOCSIS or other data at baseband.

In this embodiment, the LAN switch 71 is labelled as an Ethernet Smart Switch which is the preferred embodiment because it supports classes of service. However, packet switch 71 can be any packet switch which can properly route downstream packets and concentrate upstream packets to the LAN segment 88 coupled to the cable modem 46. In the embodiment of FIG. 4, data path 88 can be any bus or LAN segment upon which data can be sent to either the switch 71 or the DSL concentrator 102.

In the embodiment of FIG. 4, the cable modem 46 receives downstream DSL data from the three DSL channels multiplexed in any way on one or more logical channels. The cable modem also receives DOCSIS or other digital data for various services multiplexed in any way including packets broadcast as a concatenated stream or included in an MPEG transport stream where packets can be separated out from the various services by their service identifiers or destination addresses.

The cable modem 46 has the structure of cable modem 46 in FIG. 1 to receive the data that is transmitted over data path 88 to the packet switch 71. Data that is to be transmitted to the DSL concentrator 102 over data path 88 is recovered by the cable modem 46 using circuitry having the same functionality as described for the preferred or alternative embodiments of cable modem 221 in FIG. 3. Typically, the DSL data will be transmitted to cable modem 46 over the HFC as voice-over-IP packets so the cable modem 46 can use the same receiver and data recovery circuitry as used to recover the DOCSIS and other non voice-over-IP data packets. Cable modem 46, in alternative embodiments, can also have conventional DOCSIS modem circuitry to recover the non DSL data and conventional ATM cell and/or MPEG transport stream recovery circuitry to receive and recover DSL data from the three different DSL channels which has been encapsulated into ATM cells and/or MPEG transport streams.

The cable modem 46 will also have suitable interface circuitry to interface with data path 88 and transmit data to the switch 71 and DSL concentrator 102. If data path 88 is a LAN link, cable modem 46 will contain circuitry to packetize the DSL channel data (and/or DSL data packets from each of the three DSL channels) into LAN packets addressed to the DSL concentrator 102. These packets will have identifying information somewhere in the header of the outer packet or the inner packet identifying which DSL channel the packet came from, a destination address indicating the subscriber to whom the packet is to be sent, a LAN address indicating whether the packet is to be sent to switch 71 or DSL concentrator 102, and a source address indicating where any reply data packets are to be sent as well as service identifiers or other data to sort out data from different services being simultaneously used. Typically, there will be layers of packetization with IP packets inside LAN packets and possibly other packets such as MPEG packet inside the IP packets. The layers of packet header information are stripped off and the header information of the enclosed packet is used as the data winds its way through the system and the need for additional routing/sorting information arises. Thus, for example, the outer packet will typically be a LAN packet whose header address data guides the packet to either the DSL concentrator or the smart switch. The outer LAN packet header is stripped off at the concentrator or switch and the encapsulated IP packet header data is used to route the data to the appropriate balun or XDSL modem coupled to the subscriber to which the data is to be transmitted. In the case where the packet was routed to the switch 71, the switch may strip off the LAN packet header for LAN link 88 and use the address data in the encapsulated IP packet to route the packet payload data to the proper one of the baluns of which baluns 73 and 75 are typical. Each switch port such as 73 has the appropriate circuitry and protocols to interface with the LAN segment to which is connected. If the LAN segments 72, etc. are different types of LANs than LAN segment 88, then an appropriate network interface circuit for the protocols on LAN segments 72 etc. is used at each port. The switch then may then strip off the IP packet header to recover an encapsulated LAN packet of the type to be transmitted to the LAN of the subscriber. Note that the LAN protocol on LAN link 88 and on the LAN links 72 through 86 need not be the same. The encapsulated LAN packet is then launched onto the appropriate LAN link coupled to the subscriber through one of the diplexer filters 28 through 42.

As was the case for the embodiment of FIG. 1, the diplexer filters each receive downstream analog CATV signals via one of taps 12 through 26. The diplexers filter out all signals on taps 12 through 26 except the downstream analog CATV signals and couple the resulting filtered signals onto the coaxial cable portion of the appropriate one of siamese cable drop lines 100. The baseband LAN packet traffic data arriving on LAN links 72 through 86 are passed through the diplexer filters and are also coupled onto the coaxial cable portions of the appropriate drop line 100.

If data path 88 is a bus, cable modem 46 includes conventional bus driver circuitry to drive data directed to the switch 71 only to the switch and to drive data directed to the DSL concentrator only to the concentrator 102. Suitable control signals on control link 47 can be used to do this as well as to read routing table data, configure port MAC addresses, etc. In this embodiment, the data transmitted on data path 88 does not need to be packetized in an outer LAN packet to control its routing to either the DSL concentrator 102 or the switch 71 but may still be in the form of an IP packet encapsulating a LAN packet carrying DOCSIS or other types of data packet or encapsulating some other type of packet carrying the DSL data from the three channels or just the DSL PCM voice data and the digital data from the two digital DSL channels. Assuming the DSL packets are transmitted over the HFC 10 as voice-over-IP packets, these packets will be delivered in some manner over data path 88. The DSL concentrator will use the IP packet header information to route each packet to the proper one of the XDSL modems of which 350 and 352 are typical and then strip off the IP packet header. The XDSL modem will use the payload data of the IP packet to generate DSL signals and launch them onto the twisted pair to which the DSL modem is connected. These twisted pairs are shown as lines 104 through 118. These twisted pairs are shown as coupled to the switch 71 but the switch does not process the analog signals on these twisted pairs. Instead, the analog DSL signals are passed through the switch and coupled to the appropriate one of a plurality of twisted pairs of which pairs 77 and 79 are typical. In alternative embodiments, each twisted pair 104, 106 etc. may simply bypass the switch 71 altogether and couple directly to the appropriate one of the diplexer filters 28, 30 etc.

At each diplexer filter, the twisted pair is coupled to the twisted pair portion of the appropriate siamese cable drop line for transmission of the DSL signals to the subscriber.

Upstream DOCSIS and other data is transmitted over the LAN links to the switch 71 where the process described above is reversed and the data packets from all subscribers are concentrated onto data path 88 and transmitted to the cable modem. Upstream DSL signals are transmitted from each subscriber's DSL modem to the appropriate one of the XDSL modems 350, 352 etc. There, the analog signals are converted to digital data and the DSL concentrator reverses the process for the downstream data in terms of packetization and transmits the DSL data to the cable modem 46. The cable modem transmits the DSL data upstream on dedicated logical channels, or logical channels assigned by the CMTS such as assigned spreading codes, assigned timeslots, assigned groups of minislots, etc.

Figure 9:
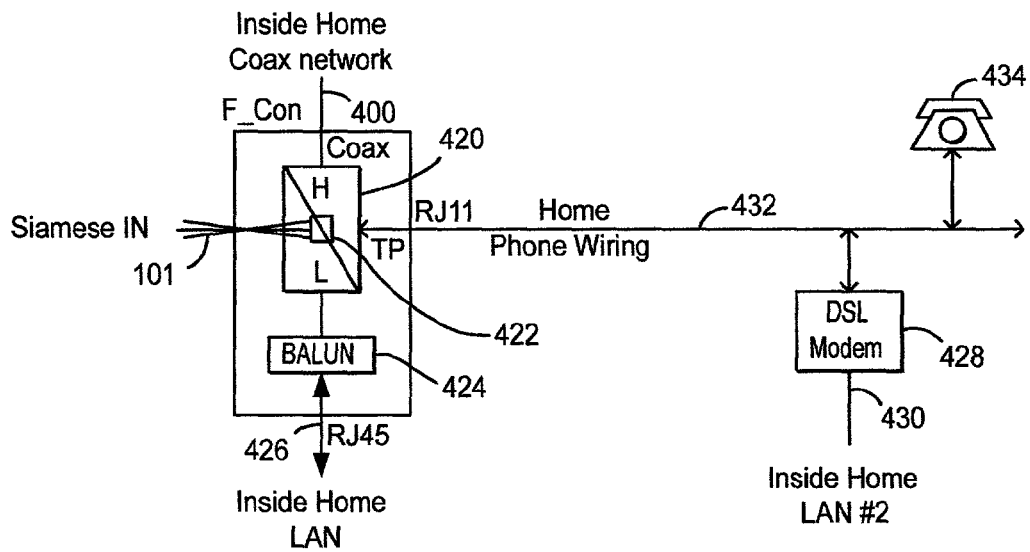
FIG. 9 is a block diagram of the circuitry inside the customer's home that cooperates with the circuitry of FIG. 4 to provide analog CATV, switched LAN and DSL services to each subscriber who shares the cable modem.

Referring to FIG. 9, there is shown a block diagram of the circuitry inside the customer's home that cooperates with the circuitry of FIG. 4 to provide analog CATV, switched LAN and DSL services. The siamese drop cable 101 is coupled to a diplexer filter 420 with junction box 422. The analog CATV signals are high pass filtered and output on coax 400. The baseband LAN packets output by packet switch 71 in FIG. 4 are low pass filtered and output through balun 424 on LAN medium 426. The DSL signals on the twisted pair portion of the siamese cable drop line 100 are coupled at junction box 422 onto the home's existing twisted pair POTS phone lines 432 and are coupled to a DSL modem 428. The DSL modem recovers the downstream broadband digital data and outputs is as LAN packets on LAN #2 medium 430. Twisted pair 432 is also coupled to a POTS phone 434 which receives the POTS signal portion of the DSL signal. DSL modem 428 also recovers the downstream data in the lower speed DSL bidirectional channel and outputs it as LAN packets on LAN #2. Upstream packets are received by DSL modem 428 from LAN #2 and converted to DSL signals for transmission over the siamese cable twisted pair portion to the appropriate XDSL modem of DSL concentrator 102.

Figure 5:
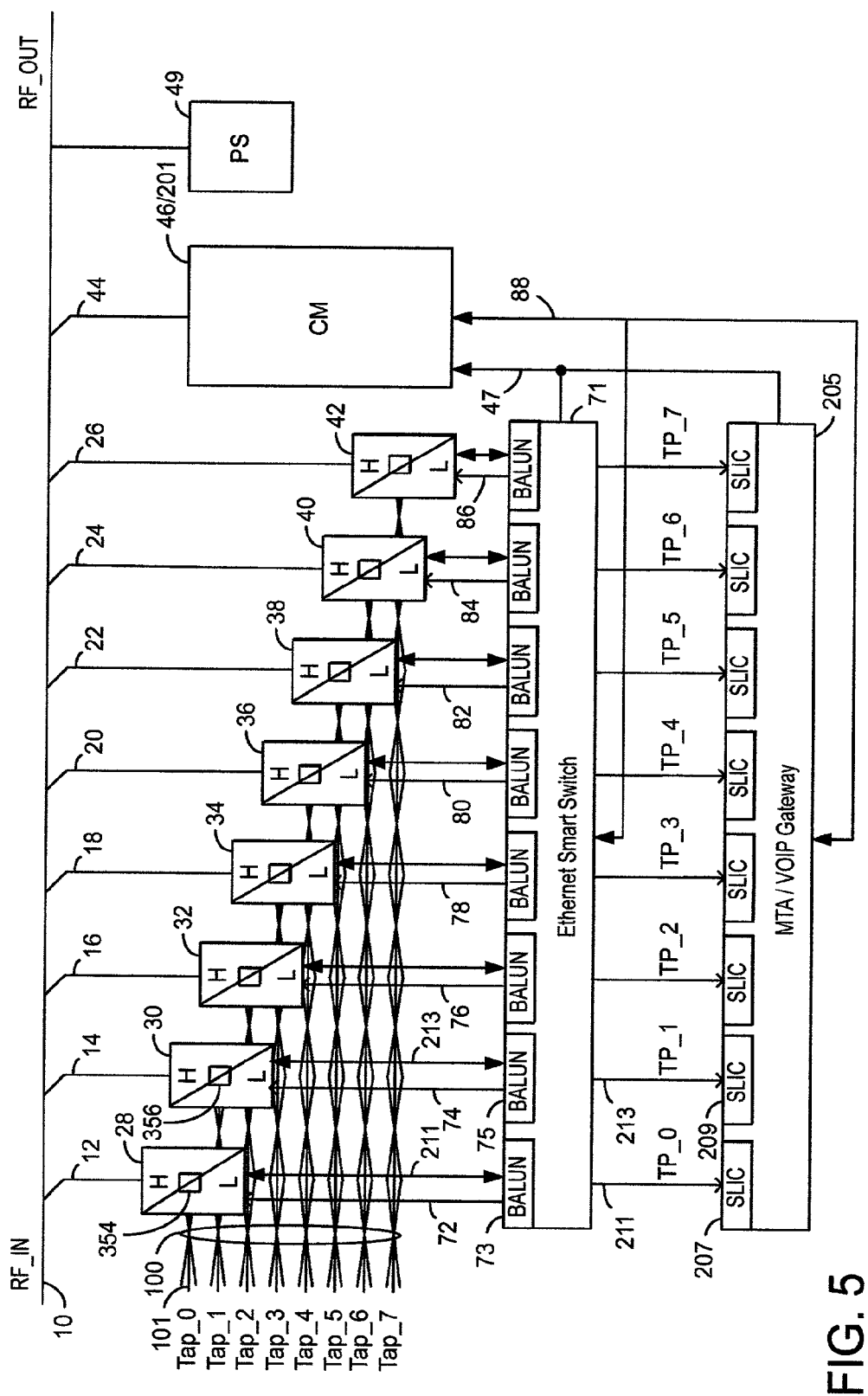
FIG. 5 is a block diagram of an embodiment of the invention to supply video, voice and data to a plurality of subscribers who share a cable modem and a LAN packet switch and a voice-over-IP gateway.

Referring to FIG. 5, there is shown an embodiment of the invention to supply video, voice and data to a plurality of subscribers who share a cable modem and a LAN packet switch and a voice-over-IP gateway. The embodiment of FIG. 5 is useful where a subscriber has CATV service and a POTS telephone line wants to add broadband digital data services and an additional phone line. As was the case for FIG. 4, structures having the same reference numbers as structures in other embodiments have the same structures as the structures which they share reference numbers with. The embodiment of FIG. 5 provide voice telephony service via the VOIP gateway 205 and shared cable modem 46/201 to a single telephone with no DSL data services. The embodiment of FIG. 5 also provides broadband data services via packet switch 71 and cable modem 46/201.

Cable modem 46/201 has the same structure of cable modem 46 in FIG. 1 for receiving downstream data from HFC 10 and sending it to switch 71 and receiving upstream traffic from switch 71 and transmitting it to the CMTS via HFC 10. Cable modem 46/201 has the same structure as cable modem 201 in FIG. 2 for sending VOIP traffic to and receiving VOIP traffic from VOIP gateway 205. Likewise, VOIP gateway 205 has the same structure as VOIP gateway 205 in FIG. 2, and packet switch 71 has the same structure as packet switch 71 in FIG. 1.

In the preferred embodiment, cable modem 46/201 recovers downstream VOIP packets from HFC 10 and encapsulates these IP packets into LAN packets suitable for transmission on LAN segment 88. The LAN packets are addressed to VOIP gateway 205. The gateway receives them and strips off the LAN packet header and uses the address information in the IP packet header to route the payload data (usually PCM voice data but some packets have control data to control the generation of call progress tones) to the appropriate one of the SLICs, of which 207 and 209 are typical) that is coupled to the subscriber to whom the IP packet is addressed. The SLIC generates appropriate call progress tones if necessary and converts any PCM or other voice data samples such as data from MPEG packets in an MPEG transport stream encapsulated in IP packets into an appropriate analog POTS signal. The POTs (conventional analog telephone signal) is driven onto a conventional twisted tip and ring pair of which pairs 211 and 213 are typical. The tip and ring pair from each SLIC is shown as coupled to the switch 71 but may bypass the switch since the switch just passes this analog POTS signal through to tip and ring pairs coupled to each output balun of the switch, of which 73 and 75 are typical. The POTS signals for each subscriber are conducted on the appropriate tip and ring pair to the appropriate one of a plurality of diplexer filters 28 through 42. The POTS signals are not filtered by the diplexer filters. Instead, they are coupled in a junction box in the diplexer filter, of which boxes 354 and 356 are typical, to the appropriate tip and ring twisted pair portion of the appropriate one of siamese cables 100 coupled to the subscriber who is making or receiving the call.

In a similar fashion, cable modem 46/201 recovers downstream DOCSIS or other format data packets encoding services like broadband internet access, distance learning or other services and/or MPEG transport stream packets containing video data. These packets have address data and service identifier data which identify the subscriber to which they are directed and the particular computer and port therein to which they are directed and the service they encode. The recovered packets are then encapsulated into LAN packets addressed to the packet switch 71. The packet switch receives them and uses the address data in the IP packet headers to route each packet to the appropriate balun coupled to the subscriber to which the packets are directed. The packets are then driven onto the appropriate LAN segment 72 through 86. The IP packet headers may be stripped off in some embodiments so that only encapsulated Ethernet or other LAN packets are transmitted. However, in the preferred embodiment, the IP packets are encapsulated in Ethernet or other LAN packets at the cable modem or packet switch 71 for transmission on the appropriate LAN of the appropriate subscriber to the appropriate device. In some embodiments, LAN link 88 and the LAN links 72 through 86 are the same LAN protocol and in other embodiments, they are different protocols. In some embodiments, data path 88 is a high speed bus such as USB, SCSI or Firewire, etc. and conventional bus technology is used to get data to the proper one of the VOIP gateway 205 or packet switch 71.

The LAN packets at baseband on LAN links 72 through 86 are filtered by the diplexer filters so they do not get onto HFC taps 12 through 26. Likewise, the downstream CATV signals on taps 12 through 26 are filtered by the diplexer filters so no other downstream or upstream RF signals get on drop lines 100 and so that the CATV analog signals do not get onto the LAN segments 72 through 86. The downstream CATV signals and the baseband LAN packets for each subscriber are mixed by the diplexer filters onto the coax segment of the appropriate customer siamese cable drop line 100.

Upstream DOCSIS and other data traffic and upstream VOIP traffic takes the reverse path described above to get to cable modem 46/201 including any required digitization, depacketization and repacketization necessary to convert signals from one format or protocol to another.

Figure 10:
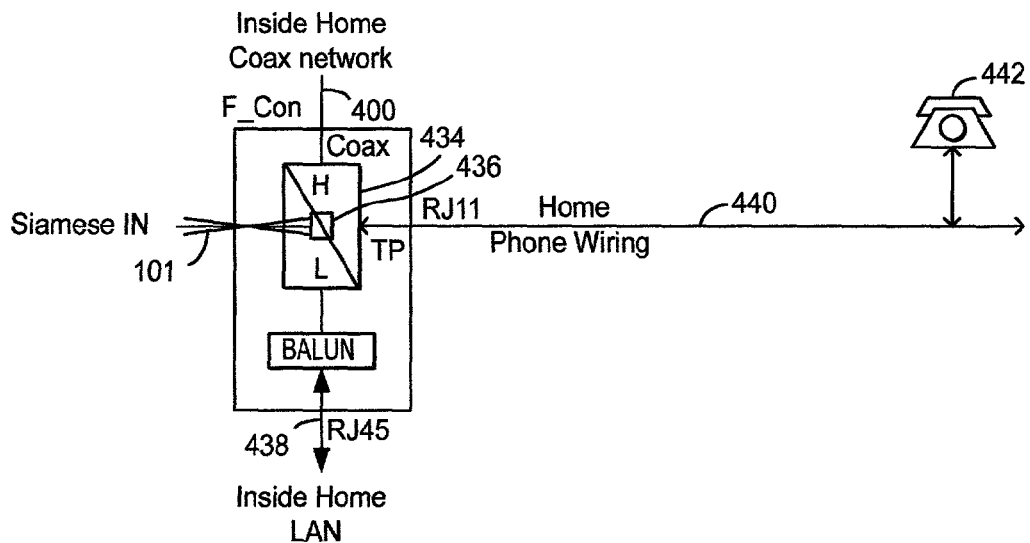
FIG. 10 is a block diagram of the circuitry inside the subscriber's home that cooperates with the shared circuitry of FIG. 5 to provide video, voice and data services.

Referring to FIG. 10, there is shown a block diagram of the circuitry inside the subscriber's home that cooperates with the shared circuitry of FIG. 5 to provide video, voice and data services. A siamese cable drop line 101 is coupled to a diplexer 434 having a junction box 436. The high frequency analog CATV signals are high pass filtered onto existing CATV distribution coax 400, and baseband LAN traffic from switch 71 in FIG. 5 is low pass filtered onto LAN medium 438 coupled to the subscribers computer. POTS signals output by the SLICs 207 etc. in FIG. 5 on the twisted pair portion of the siamese cable drop lines are coupled by junction box 436 onto the homes existing twisted pair phone wiring 440 and coupled to phone 442.

Figure 11:
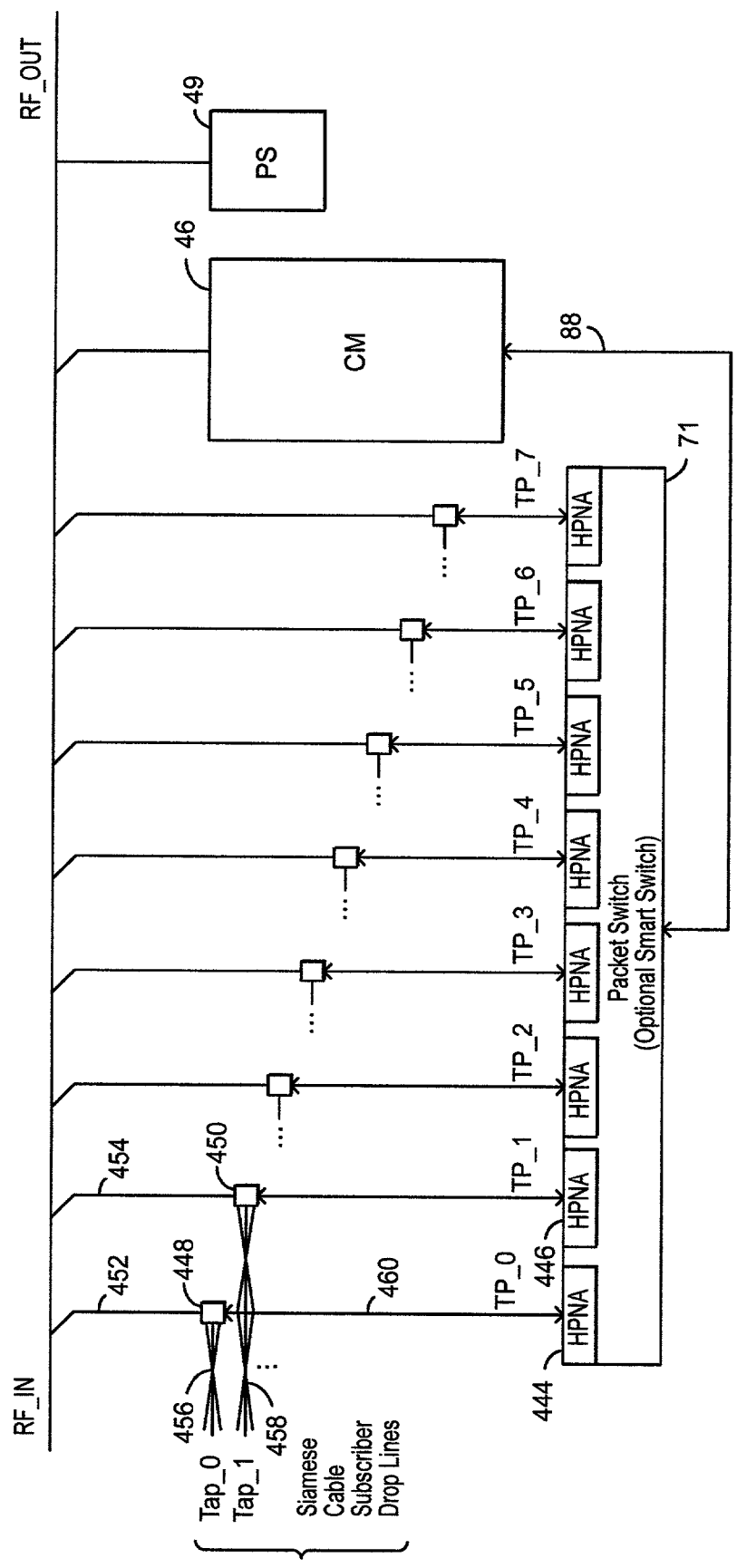
FIG. 11 is a block diagram of another embodiment of the shared circuitry which can be placed outside the premises of several customers to share a cable modem and packet switch to provide analog CATV signals and bidirectional digital data services via an HPNA LAN in each subscriber premises.

Referring to FIG. 11, there is shown a block diagram of another embodiment of the shared circuitry which can be placed outside the premises of several customers to share a cable modem and packet switch to provide analog CATV signals and bidirectional digital data and POTS phone services via an HPNA LAN in each subscriber premises. The main difference between this embodiment and the embodiment of FIG. 1 is that a twisted pair LAN data path is used instead of a coaxial cable data path. The embodiment of FIG. 11 is useful when a subscriber has CATV service and wishes to add broadband digital services and/or one or more VOIP phone lines and use a twisted pair HomePNA network instead of other types of LAN mediums for distribution of the digital data. The shared cable modem 46 has the same structure and alternative embodiments as the cable modem 46 in FIG. 1 as does the power supply 49. Packet switch 71 can be any packet switch or Smart Switch and have the same structure and alternative embodiments as switch 71 in FIG. 1. Preferably the switch 71 is a smart switch to support quality of service protocols.

The difference between switch 71 of FIG. 1 and switch 71 of FIG. 11 is that Home PNA network interface cards (NIC) are use instead of baluns at each port. Thus, instead of driving a coaxial cable LAN segment at each port, an HPNA NIC at each port, of which, 444 and 446 are typical, drives a twisted pair LAN segment. HPNA stands for Home Phoneline Networking Alliance (HomePNA) which is a standards organization that have been developing standards for local area networks implemented over home phone lines. U.S. Pat. No. 6,252,755 teaches technology to implement HPNA networks over the home's power lines instead of phone lines, which is hereby incorporated by reference, and in some embodiments, the power lines of the home may be used instead of the phone lines. The HPNA network interface cards used in this embodiment of the invention may be of either type, and subsequent references to twisted pair are to be interpreted to include power lines.

Each twisted pair LAN segment is coupled to a junction box, of which boxes 448 and 450 are typical. Each junction box is also coupled to a coaxial cable tap, of which taps 452 and 454 are typical. Each junction box is also coupled to a siamese cable drop line of which 456 and 458 are typical. Each drop line is coupled to the circuitry of FIG. 12 in a subscriber home. As an example of the coupling in each junction box, junction box 448 couples the analog CATV signals on its tap 452 to the analog cable portion of siamese cable 456 and couples the LAN traffic and voice-over-IP packets on twisted pair 460 onto the twisted pair portion of the siamese cable.

Both data and VOIP phone service can be provided by the embodiment of FIG. 11 by having the cable modem 46 structured to recover downstream VOIP packets as well as LAN packets addressed to one of the subscribers who shares the cable modem. Both types of packets are transmitted to the packet switch 71 via LAN segment 88 or other data path. The packet switch routes both types of packets to the appropriate HPNA NIC serving the subscriber to which the packets are directed. The HPHA NIC transmits the packets on a twisted pair LAN segment using the HPNA MAC and physical layer protocols.

Figure 12A:
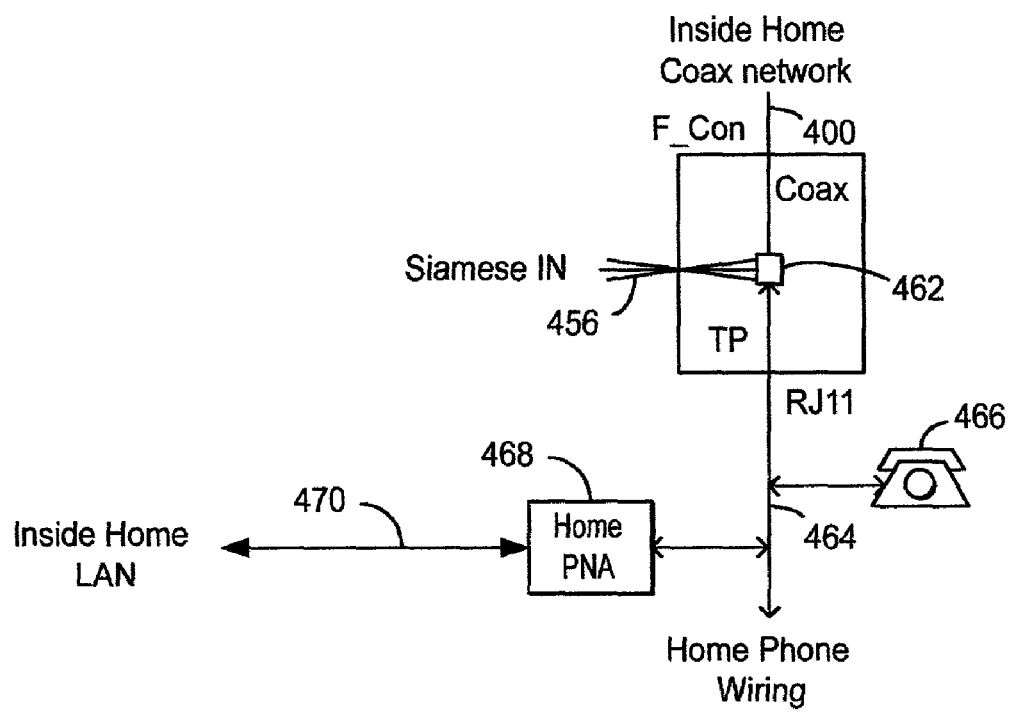
FIG. 12 is an embodiment of circuitry outside each customer premises which can be use a shared cable modem to provide POTS phone service on one or more POTS lines to each subscriber which shares the cable modem without a direct connection to the PSTN.
Figure 12B:
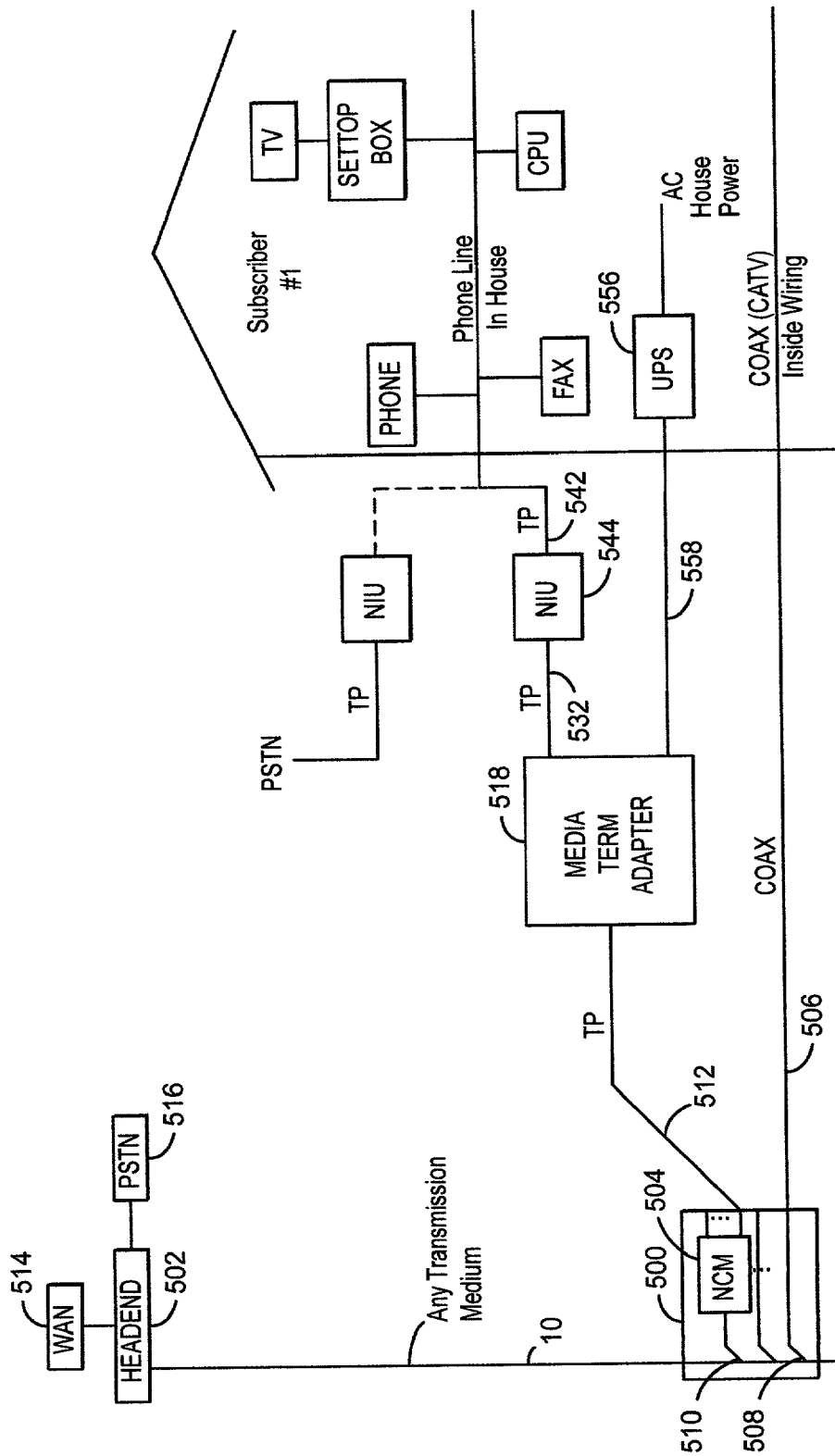

Referring to FIG. 12, there is shown an embodiment for equipment to be placed inside or outside a subscriber premises to cooperate with the shared circuitry of FIG. 11 to provide analog CATV, POTS and broadband data services including video-on-demand. The embodiment of FIG. 12 uses the Network Cable Modem to provide not only POTS phone service via VOIP packets without a direct connection to the PSTN. There may but does not necessarily have to be a connection to the PSTN at the HFC headend since the headend may receive VOIP packet data over the internet without ever accessing the PSTN or only accessing the PSTN at some other server somewhere out on the internet.

In the embodiment of FIG. 12, analog CATV signals, VOIP packets and LAN packet traffic arrives on transmission medium 10 at a network device 500. There, a tap couples the CATV signals directly to a coaxial cable drop line 506 which is coupled to the existing or newly installed CATV coax distribution network in the home so analog CATV signals can be conventionally received. Another tap 510 couples the transmission medium 10 to a Network Cable Modem 504. The NCM 504 serves to recover downstream LAN and VOIP packets encapsulated in packets of the type used to transmit downstream data on transmission medium 10. The NCM typically has one bidirectional port coupled to the transmission medium 10 and a plurality of ports coupled to the subscribers who share the NCM. Each port is coupled to a Media Terminal Adapter 518 dedicated to serving one customer by a LAN segment 512 of any protocol and media type adequate to handle the anticipated traffic volume and service types. Each NCM port will have a NIC appropriate to the type of LAN segment 512. Each NCM will typically have the structure of FIG. 11 with the coaxial cable portion of the siamese drop cable coupled to coax 506 (this particular version is not shown in FIG. 12). In other embodiments like that shown in FIG. 12, each NCM is only comprised of the following parts of FIG. 11 connected as shown in FIG. 11; cable modem 46, power supply 49, packet switch 71, LAN segment 88, HPNA ports 444 or whatever other type of NIC is necessary to drive LAN segment 512 in FIG. 12; and twisted pair or other LAN segments like 460 which correspond for each subscriber to LAN segment 512 in FIG. 12. The junction boxes 448 can be eliminated in this embodiment since a tap like tap 452 on medium 10 is coupled directly to the coaxial cable portion 506 of the siamese cable drop line.

Typically, the downstream LAN and VOIP packets are IP packets encapsulated in Ethernet LAN packets which are encapsulated in the type of packet used on the medium 10 such as MPEG packets transmitted using a DOCSIS protocol. The IP packets are addressed to the IP address of a particular subscriber's computer, and are themselves encapsulated within Ethernet packets addressed to the particular one of the various peripherals coupled the HPNA LANs in the various subscriber premises. The downstream packets have the MPEG packet headers and trailers stripped off in the NCM after the information in the headers and trailers is used to error correct the packet, determine what service the packet data encodes. Then the IP packet header and trailer data is used to error correct the IP packet and the address and port data therein is used to determine if the recovered packet is addressed to one of the subscribers who shares the NCM. If so, the packet is kept. If not, the packet is discarded. This leaves the encapsulated Ethernet or other LAN packets. These packets are transmitted on transmission medium 512 devoted to subscriber #1 by suitable network interface card. Transmission medium 512 could be a fiber optic cable or any other suitable LAN medium. In the preferred embodiment, NCM 504 has a separate HPNA NIC for each subscriber, and transmission medium 512 is twisted pair.

The network device 500 is coupled to and receives downstream packets from a headend 502 by any transmission medium 10 such as HFC of a CATV system, wireless, satellite uplink and downlink, microwave or any other broadband data path. Upstream LAN and VOIP packets from each subscriber are sent by the appropriate NCM to the headend where they are processed by routing to the appropriate server on WAN 514 or converted to POTS signals and coupled to PSTN 516. Downstream LAN and VOIP packets received from a server on the WAN or from a subscriber line interface circuit coupling the headend to the PSTN are transmitted to all network devices 500 over transmission medium 10. The network device 500 has a plurality of NCMs 504 or Network Cable Modems each of which is shared by 4 to 16 subscribers. Each NCM has the structure of FIG. 11 in the preferred embodiment and each NCM receives and recovers all the LAN and VOIP packets, but keeps only those packets addressed to one of the subscribers which shares the NCM. The NCM uses the address data in the LAN and VOIP packet headers to route each packet to the appropriate network interface card and LAN segment 512 serving the subscriber to whom the packet is addressed.

Further processing must now be performed to separate the VOIP and LAN packets and convert each to the proper signal format and frequency band for an HPNA signal. That is done in the Media Terminal Adapter or MTA 518.

Figure 13:
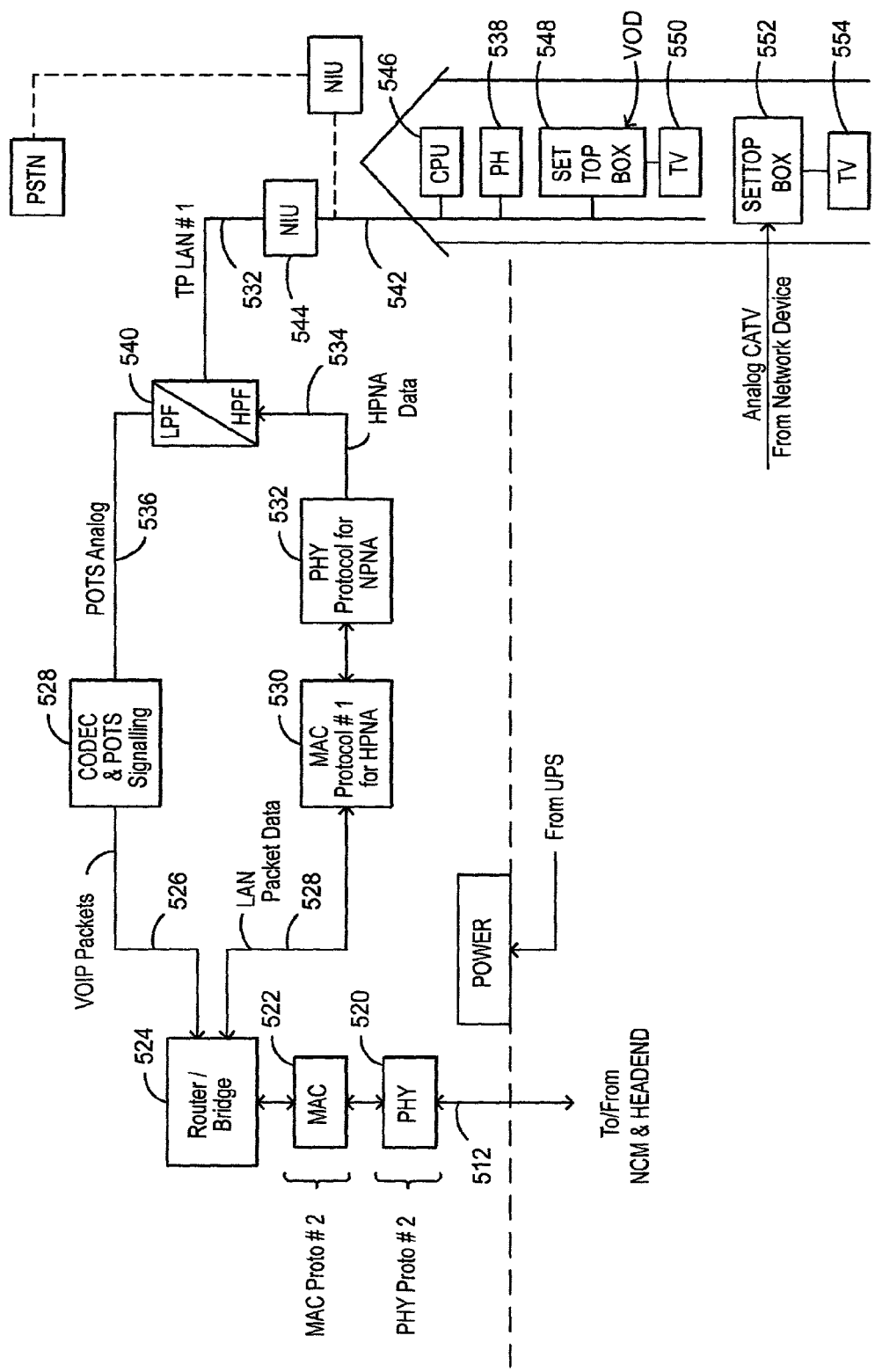
FIG. 13 is a block diagram of the media terminal adapter 518 in FIG. 12.

FIG. 13 is a block diagram of the media terminal adapter. LAN segment 512 is coupled to a physical layer network interface card 520 (PHY) which implements whatever physical layer protocol is being used on LAN 512 in both directions. Recovered downstream packets/bits are sent to MAC layer circuitry/process 522 which reassembles packets for transmission to router/bridge 524. Upstream packets received by router/bridge 524 are routed to the MAC process 522 which buffers them and implement whatever media access control protocol is in use on LAN segment 512. When packets are to be transmitted, PHY NIC 520 retrieves them and transmits then upstream to NCM 504 using the upstream PHY protocol in use on LAN 512.

The packets transmitted on medium 512 include both LAN data packets and VOIP packets. Router/bridge 524 separates out the VOIP packets and routes them via LAN segment 526 to CODEC and POTS signalling subscriber line interface circuit 528. There, the VOIP packet data is converted back to a POTS analog signal in the proper low frequency band below about 4 kHz reserved for POTS in the HPNA frequency plan. Appropriate POTS call progress tones are also generated in circuit 528 to implement the audibile POTS feedback such as dial tone, ringing, busy signal, etc. that is familiar to all. These downstream analog POTS signals are transmitted on HPNA LAN segment 536 (typically twisted pair) in the below 4 kHz band of frequencies.

Upstream POTS signals on HPNA LAN segment 536 from subscriber telephone 538 are converted from analog to digital in 528 and packetized into VOIP packets. These VOIP packets are sent to router 524 where they are routed to the headend through MAC 522 and PHY 520.

The LAN packet data is routed on LAN segment 528 to media access control circuit 530. This MAC circuit 530 buffers the downstream LAN packets and implement the HPNA media access control protocol in use on twisted pair HPNA LAN segment 532.

Upstream LAN packets are also received by the MAC circuit 530 from a PHY circuit 532 and are buffered if necessary and transmitted to the router/bridge on LAN 528 by implementing whatever MAC protocol is in use on LAN 528. The router/bridge routes these upstream LAN packets to MAC circuit 522 which buffers them if necessary and implements the MAC protocol on LAN segment 512. When the PHY circuit 520 is ready to transmit them, they are retrieved from the buffer and transmitted on LAN 512 using whatever PHY layer upstream protocol is in use for LAN 512.

Returning to MAC circuit 530, downstream LAN packets to be sent to the subscriber are retrieved by PHY circuit 532 from a buffer in MAC circuit 530 when they are ready to be sent. The PHY circuit 532 modulates the downstream LAN packets onto a data carrier in the 1–5 mHz portion of the HPNA frequency plan and transmits the signal on HPNA LAN segment 534 which is typically twisted pair phone line.

HPNA LAN segments 536 and 534 are coupled to the low pass and high pass inputs, respectively, of a diplexer filter 540. There, they are combined and output on HPNA LAN segment 532 in the two different frequency bands of the HPNA frequency plan (below 4 kHz for POTS and above 1 mHz for data). The HPNA LAN segment 532 is coupled to the subscribers twisted pair POTS phone signal distribution wiring through an NIU terminal block. In the subscriber premises, a computer or other LAN type peripheral 546 with an HPNA NIC receives all the LAN packet data. The data packets received on the HPNA LAN segment are Ethernet packets encapsulating IP packets. The Ethernet packet header address data is used to determine which packets to keep. The Ethernet packet footer data is used to error correct the packet. The HPNA NIC strips off the Ethernet header and footer to expose the encapsulated IP packet. The port data in the IP packet header controls to which process the IP protocol stacks routes the data. Other data in the header identifies the service whose data is in the payload section.

Video-on-demand HPNA Ethernet packets are received by a settop decoder 548 for viewing on television 550. Analog CATV signals are received from the analog CATV cable of the subscriber premises via settop decoder 552 and viewed on TV 554.

Returning to the consideration of FIG. 12, all components on the subscriber side of MTA 518 having the same reference number as a component in FIG. 13 are the same component. The MTA is powered, typically, by an uninterruptible power supply 556 and power line 558. The UPS 556 is coupled to the power lines in the subscriber house and provides reliable power so that phone service will not be interrupted during power outages.

The embodiment of FIGS. 12 and 13 differs over the voice-over-IP prior art because in the prior art, each subscriber had to have her own cable modem. This was unnecessarily expensive. In the embodiment of FIG. 12, multiple subscriber share the network cable modem 504, and each subscriber only needs to have the much less complex and expensive media terminal adapter 518.

Figure 14:
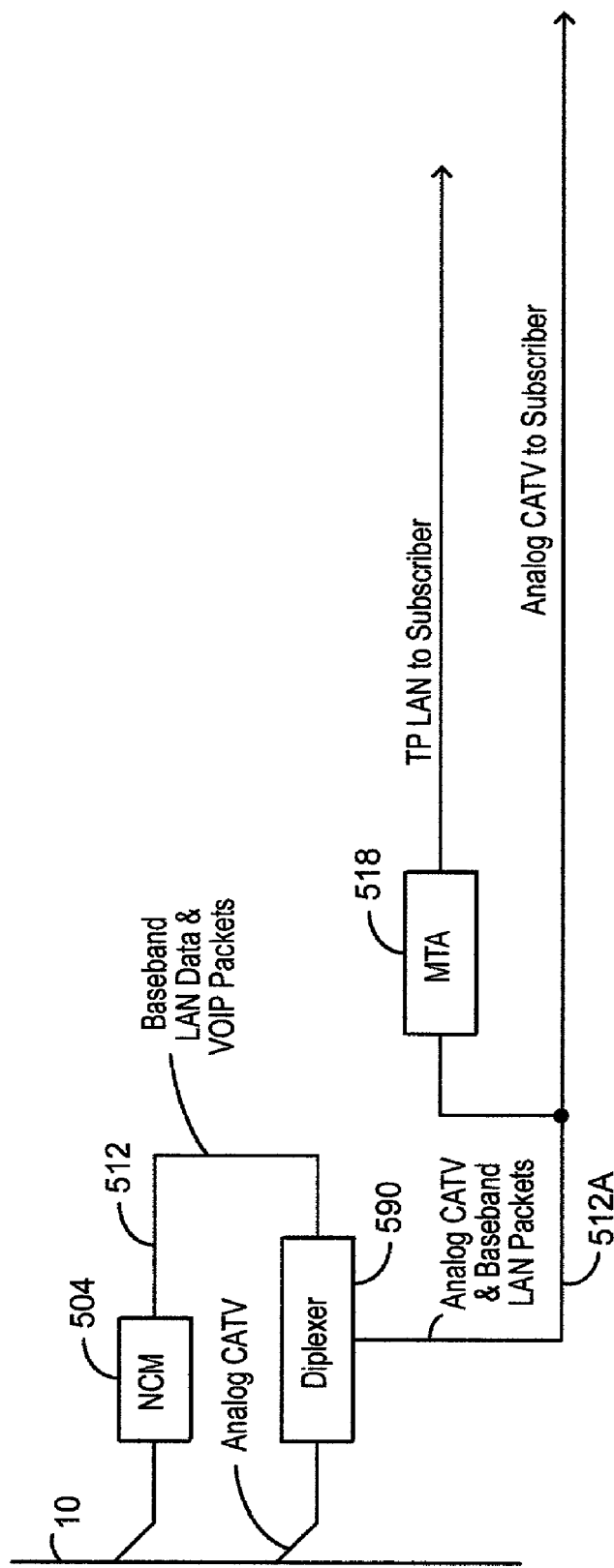
FIG. 14, there is shown a variation of the distribution system of FIG. 12 which differs in the sense that it blocks the subscriber from upstream access to transmission medium 10.

Referring to FIG. 14, there is shown a variation of the distribution system of FIG. 12 which differs in the sense that it blocks the subscriber from upstream access to transmission medium 10. In FIG. 12, the transmission medium 10 is coupled directly to the subscriber premises by coaxial cable 506. This allows an unscrupulous subscriber to inject jamming signals onto medium 10 to jam upstream transmissions of all other subscribers. This is eliminated by the architecture of FIG. 14. In FIG. 14, the baseband LAN packets output on LAN segment 512 by cable modem 504 are coupled to the low pass input of diplexer filter 590. The high pass input of the diplexer is coupled directly to the transmission medium 10. The combined high frequency analog CATV signals and baseband LAN signals are output on LAN segment 512A to MTA 518. LAN segment 512A is a coaxial cable and is also coupled to the analog CATV signal distribution coax in the subscriber premises. Any upstream jamming signals injected onto LAN segment 512A are blocked by diplexer 590 from reaching the transmission medium, but upstream baseband LAN packets and VOIP packets are passed through to LAN segment 512 for upstream transmission by NCM 504.

Although the invention has been disclosed in terms of the preferred and alternative embodiments disclosed herein, those skilled in the art will appreciate that modifications and improvements may be made without departing from the scope of the invention. All such modifications are intended to be included within the scope of the claims appended hereto.

What is claimed is:

1. A process comprising the steps of:
receiving simultaneously in a plurality of diplexer filters froth a cable TV signal delivery medium downstream analog CATV signals and downstream RF signals carrying downstream packet data and upstream RF signals carrying upstream packet data and filtering out in each diplexer filter all but said downstream analog CATV signals, and, in each said diplexer filter, receiving from a LAN segment input baseband packet data transmissions, and, in each diplexer filter, combining said baseband packet data transmissions with said downstream analog CATV signals and transmitting the combined signals on a coaxial cable drop line coupled to a local area network of a predetermined one of a plurality of subscribers who share a cable modem outside the premises of said subscribers, and selectively filtering to select upstream baseband packet data from the local area network of each subscriber on said coaxial cable drop line and coupling said selected upstream baseband packet data onto said LAN segment;

receiving simultaneously in a shared cable modem from said cable TV signal delivery medium downstream analog CATV signals and downstream RF signals carrying downstream packet data and upstream RF signals carrying upstream packet data transmitted by other cable modems and filtering out in said shared cable modem all but said downstream RF signals carrying downstream packet data and recovering said packet data and filtering out all packets not addressed to a subscriber that is sharing said shared cable modem and transmitting the remaining packets out on a first LAN segment or other data path, and receiving upstream baseband packet data from said first LAN segment and transmitting them to said headend over said cable TV signal delivery medium using whatever upstream media access control and physical layer protocols are in use on said able TV signal delivery medium;

receiving said packets transmitted on said first LAN segment or other data path and examining the address data in the packet headers and routing each packet to an appropriate LAN segment or segments coupled to one or more diplexer filters, and receiving said upstream baseband packet data transmissions from said LAN segments coupled to said diplexer filters and concentrating them onto said first LAN segment for transmission to said shared cable modem.

2. The process of claim 1 further comprising the steps carried out in each subscriber premises of receiving said downstream baseband packet data transmissions with said downstream analog CATV signals in a diplexer filter from one of said coaxial cable drop lines and high pass filtering said analog CATV signals and coupling them to a coaxial cable CATV signal distribution system in said customer premises, and low pass filtering said baseband packet data and coupling said packet data to a local area network medium in said customer premises, and selectively filtering upstream baseband packet data transmissions on said local area network medium so as to couple them onto said coaxial cable drop line, and receiving upstream baseband packet data transmissions from said local area network medium and selectively filtering so as to couple said upstream baseband packet data transmissions onto said coaxial cable drop line.

3. An apparatus comprising:
filtration and combining means having a plurality of baseband LAN data inputs and a plurality of RF inputs for coupling to a CATV signal delivery medium and having a plurality coaxial cable drop line outputs for coupling to coaxial cable drop lines, each coupled to a local area network of a predetermined subscriber, for receiving at each of said RF inputs downstream analog CATV signals and downstream RF signals carrying downstream packet data and upstream RF signals carrying upstream packet data and for filtering all but said downstream analog CATV signals and transmitting said downstream analog CATV signals out simultaneously at each coaxial cable drop line output, and, for receiving at each LAN data input packet data coupled to a LAN segment transmissions addressed to a predetermined subscriber, and for combining said baseband packet data transmissions with said downstream analog CATV signals and transmitting the combined signals on the coaxial cable drop line output coupled to a local area network of a predetermined subscriber to which said packet data is supposed to be delivered, and for receiving upstream baseband packet data on said coaxial cable drop lines from one or more of said subscribers and selectively filtering so as to couple said upstream baseband, packet data onto an appropriate LAN segment dedicated to carrying upstream and downstream LAN packet traffic for the particular subscriber from which each upstream LAN packet originated;

shared cable modem means having an RF input for coupling to a CATV signal delivery medium and having a LAN output coupled to a LAN segment, for receiving simultaneously downstream analog CATV signals and downstream RF signals carrying downstream packet data and upstream RF signals carrying upstream packet data transmitted by other shared and unshared cable modems and for filtering out all but said downstream RF signals carrying downstream packet data and for recovering said packet data and for filtering out all packets not addressed to a subscriber that is sharing said shared cable modem means and for transmitting the remaining packets out on a first LAN segment coupled to said LAN output, and for receiving upstream LAN packets from said first LAN segment and transmitting them to said headend using whatever media access control and physical layer protocols that are in use on said CATV signal delivery medium;

switch and concentrator means having a first LAN segment input coupled to said first LAN segment and having a plurality of LAN ports, each coupled by a LAN segment to a LAN: input of said filtration and combining means, for receiving said packets transmitted on said first local area network segment from said shared cable modem means and examining the address data in the packet headers and routing each packet to an appropriate LAN segment or segments coupled to one or more LAN input of said filtration and combination means, and for receiving upstream LAN packet data from each said LAN segment coupled to a LAN input of said filtration and combining means and concentrating said upstream LAN packets for transmission on said first LAN segment to said shared cable modem means; and filtration and distribution means in each customer premises coupled by a coaxial cable to one of said coaxial cable drop lines from said filtration and combining means for selecting said analog CATV signals and coupling them onto an analog CATV signal distribution system in said customer premises, and for selecting said baseband packet traffic and coupling it to a local area network medium in said customer premises.

4. A signal distribution system for transmitting and receiving signals on a cable television medium carrying analog television broadcasts and digital voice-over-IP data carrying telephony signals, comprising:

a shared cable modem coupled to said medium;

a plurality of junction boxes, each having a coaxial cable input, a twisted pair tip and ring input and a siamese cable output for coupling to a siamese cable for coupling to at least one telephone and at least one television in the premises of a subscriber who shares said cable modem, each said junction box coupling analog phone signals arriving at said twisted pair tip and ring input to a tip and ring twisted pair terminal at said siamese cable output so that when a siamese cable is correctly coupled to said output, said twisted pair tip and ring input will be coupled to a tip and ring pair of said siamese cable going to the premises of a subscriber that shares said cable modem, and each said junction box coupling analog cable television signals received at said coaxial cable input to the coaxial cable portion of any siamese cable coupled to said siamese cable output;

a voice-over-IP gateway coupled by a data path to said shared cable modem, and having a plurality of subscriber line interface circuits, each coupled to said twisted pair tip and ring input of a junction box by a tip and ring twisted pair.

5. The apparatus of claim 4 further comprising a junction box in each subscriber premises having an input for coupling to a siamese cable coupled to a junction box outside said customer premises, said junction box having connections to couple said coaxial cable portion of said siamese cable to an analog CATV signal distribution system in said customer premises and connections to couple said twisted pair portion of said siamese cable to a twisted pair POTS analog phone signal distribution system in said customer premises.

6. The apparatus of claim 4 wherein said cable modem functions to receive said downstream voice-over-IP packets and select only those addressed to a subscriber that shares said cable modem and route them to said voice-over-IP gateway, and wherein said voice-over-IP gateway functions to receive said voice-over-IP packets from said cable modem and routes them to the subscriber line interface circuit coupled to the subscriber to which said packets are addressed.

7. An process comprising:

receiving radio frequency signals bearing downstream voice-over-IP packets and recovering said voice-over-IP packets and selecting only those packets which are addressed to a subscriber sharing a cable modem;

transmitting the selected downstream voice-over-IP packets from said shared cable modem to a voice-over-IP gateway having a plurality of subscriber line interface circuits;

using the addressing information in said selected packets to route each packet to the appropriate subscriber line interface circuit;

in each subscriber line interface circuit, generating conventional POTS analog telephony signals and transmitting said signals to a subscriber who shares said cable modem via a tip and ring pair of a siamese cable, and receiving upstream POTS telephony signals and converting them to upstream POTS digital data;

packetizing said upstream POTS digital data and routing said upstream POTS digital data packets to said shared cable modem;

transmitting said upstream POTS digital data packets to a headend of a cable TV system via a hybrid fiber coaxial cable network using whatever media access control: and physical layer protocols are in use on said hybrid fiber coaxial cable network;

receiving downstream CATV analog signals from said headend via said hybrid fiber coaxial cable network and transmitting said CATV analog signals to each subscriber which is sharing~ said cable modem via the coaxial cable portion of a siamese cable drop line going to the premises of said subscriber.

8. The process of claim 7 further comprising the steps of coupling signals from a coaxial cable portion of a siamese cable drop line to an analog CATV signal distribution system in the customer premises and coupling POTS analog telephone signals from a twisted pair portion of said siamese cable drop line to a POTS analog telephone signal distribution system in said customer premises.

9. An apparatus comprising:

cable modem means for receiving from a transmission medium signals bearing voice-over-IP packets and recovering said voice-over-IP packets and selecting only those packets which are addressed to a subscriber sharing said cable modem means and for transmitting the selected packets over a LAN segment or other data path;

voice-over-IP gateway means having a plurality of subscriber line interface circuit means for using the addressing information in said selected packets to route each packet to the appropriate subscriber line interface circuit means;

a plurality of subscriber line interface circuit means, each for generating conventional POTS analog telephony signals from said voice-over-IP packet data routed to it and for transmitting said POTS analog telephony signals to a subscriber who shares said cable modem means via a tip and ring pair of a siamese cable, and for receiving upstream POTS telephony signals and converting them to upstream POTS digital data;

and wherein said voice-over-IP gateway means also functions to packetize said upstream POTS digital data and route the resulting packets to said shared cable modem;

and wherein said cable modem means also functions to transmit said upstream POTS digital data packets to the headend of a cable TV system via a hybrid fiber coaxial cable network using whatever media access control and physical layer protocol is in use on said transmission medium; and means for receiving downstream CATV analog signals from said headend via said hybrid fiber coaxial cable network and transmitting said CATV analog signals to each subscriber which is sharing said cable modem via the coaxial cable portion of a siamese cable drop line going to the premises of said subscriber; and distribution means in each said customer premises for coupling said analog CATV signals arriving on the coaxial cable portion of a siamese cable drop line to an analog CATV signal distribution system in said customer premises and for coupling a twisted pair portion of said siamese cable drop line to an analog POTS telephone distribution system in said customer premises.

10. An apparatus comprising:

a shared cable modem for coupling to a hybrid fiber coaxial cable CATV signal distribution medium;

a DSL concentrator coupled to said shared cable modem by a LAN segment or data path, each DSL concentrator having a plurality of XDSL modems, where XDSL means any type of DSL modem, each XDSL modem coupled to a twisted pair telephone line to send and receive XDSL signals therethrough;

a plurality of siamese cable drop lines for coupling to a plurality of subscribers, each having a twisted pair and a coaxial cable;

a plurality of junction boxes having a coaxial cable input for coupling to said hybrid fiber coaxial cable CATV signal distribution medium by a coaxial cable tap and each having a tip and ring input coupled to a twisted pair coupled to an XDSL modem in said DSL concentrator, and each having an output coupled a siamese cable, and functioning to couple XDSL signals arriving at said tip and ring input from an XDSL modem of said DSL concentrator to said twisted pair of said siamese cable coupled to said output and functioning to couple analog CATV signals received at said coaxial cable input to the coaxial cable of the siamese cable coupled to said output.

11. A process comprising:

using a shared cable modem, receiving from a transmission medium signals bearing downstream digital data representing the POTS, high speed downstream and lower speed bidirectional channels of DSL signals for each of a plurality of subscriber who share a cable modem, and recovering said digital data for each subscriber and determining to which subscriber sharing said cable modem the recovered data pertains;

transmitting the recovered data from said shared cable modem to a DSL concentrator having a plurality of XDSL modems therein or associated therewith;

routing said digital data received from said shared cable modem to the appropriate XDSL modem assigned to service a particular subscriber which shares said cable modem;

in each XDSL modem converting said digital data to a XDSL signal and transmitting said XDSL signal to a subscriber who shares said cable modem via a tip and ring pair of a siamese cable, and receiving upstream XDSL signals and converting them to upstream XDSL digital data;

transmitting said upstream digital data from each said XDSL modem to said shared cable modem via a LAN segment or other data path;

transmitting said upstream XDSL digital data from each subscriber to a headend of a cable TV system using said shared cable modem via a hybrid fiber coaxial cable transmission medium using whatever media access control protocol and physical layer protocol is in use on said hybrid fiber coaxial cable transmission medium;

receiving downstream CATV analog signals from said headend via said hybrid fiber coaxial cable medium and transmitting said CATV analog signals to each subscriber which is sharing said cable modem via a coaxial cable portion of a siamese cable drop line going to the premises of said subscriber.

12. An apparatus comprising:

shared cable modem means for receiving from a CATV signal delivery medium signals bearing downstream digital data representing the POTS, high speed downstream and lower speed bidirectional channels of DSL signals for each of a plurality of subscriber who share said cable modem means, and for recovering said digital data for each subscriber and determining to which subscriber sharing said cable modem means the recovered data pertains, and for transmitting the recovered data from said shared cable modem to a DSL concentrator means having a plurality of DSL modem means therein or associated therewith, and for receiving upstream DSL data packets and transmitting them over said CATV signal delivery medium using whatever media access control and physical layer protocols are in use on said CATV signal delivery medium;

DSL concentrator means having a plurality of XDSL modem means, each assigned to service one subscriber who shares said cable modem means, for routing said digital data received from said shared cable modem means to the appropriate XDSL modem means assigned to service a particular subscriber to whom a DSL signal created from said received digital data is supposed to be sent;

each of said XDSL modem means for converting said digital data routed to it by said DSL concentrator to an XDSL signal and transmitting said XDSL signal to a subscriber who shares said cable modem means and to whom said received digital data is addressed, said transmission being via a tip and ring pair of a siamese cable, and for receiving upstream DSL signals and converting them to upstream DSL data packets;

and wherein said DSL concentrator means further functions to transmit said upstream DSL data packets from each said XDSL modem to said shared cable modem means via a LAN segment or other data path;

filter means for receiving downstream CATV analog signals from said headend via said hybrid fiber coaxial cable medium and for transmitting said CATV analog signals to each subscriber which is sharing said cable modem via a coaxial cable portion of a siamese cable drop line going to the premises of said subscriber;

in each subscriber premises, a junction box coupling a coaxial cable portion of said siamese cable drop line to a CATV coaxial cable signal distribution system in the subscriber premises and coupling the twisted pair portion of said siamese cable drop line to a twisted pair POTS phone signal distribution system in said subscriber premises; and an XDSL modem means coupled to said twisted pair POTS phone signal distribution system in said subscriber premises for recovering downstream LAN packets from both the high speed downstream and lower speed bidirectional channels of the XDSL signal on said twisted pair POTS phone signal distribution system and for outputting said recovered downstream LAN packets on a LAN transmission medium in said subscriber premises, and for receiving upstream LAN packets for the DSL bidirectional lower speed channel and converting them to signals for said upstream DSL bidirectional channel.

13. A signal distribution system for serving a plurality of customers using a shared cable modem coupled to a shared CATV signal delivery medium, comprising:

a shared cable modem coupled to said medium for recovering downstream LAN packets and downstream DSL packet data and outputting packet data on a local area network segment, and for receiving upstream XDSL packet data and transmitting it to a headend via said medium;

a shared local area network packet switch and concentrator coupled by a LAN port and local area network segment to said cable modem and having at least one LAN port for each subscriber that shares said modem;

a plurality of diplexer filters each having high frequency input coupled to said cable TV signal delivery medium and a low frequency input coupled to a LAN port of said switch and concentrator and each having a drop cable output for coupling to a coaxial cable in a siamese cable drop line, each diplexer filter having a junction box therein having a twisted pair input and a twisted pair output for coupling to the twisted pair of one of said siamese cable drop lines, each said diplexer filter and junction box combination functioning to filter out all signals but downstream analog cable TV broadcast signals and couple said analog cable TV broadcast signals onto the coaxial cable of a siamese cable drop line and to receive baseband LAN packet data from said cable modem and packet switch and couple said LAN packet data onto a coaxial cable portion of the appropriate siamese cable drop line coupled to the subscriber to which the siamese cable is connected along with said analog TV signals and for selectively filtering to select upstream LAN packet data packets from said coaxial cable portion of each siamese cable drop line and transmit said selected upstream LAN packets to the appropriate LAN port of said packet switch, and said junction box for coupling XDSL signals received at said twisted pair input onto a twisted pair portion of said siamese cable drop line coupled to the subscriber premises to which said XDSL signals are to be delivered and for coupling upstream XDSL signal onto the appropriate one of a plurality of twisted pair telephone lines dedicated to transmission of XDSL signals for the subscriber from whom said upstream XDSL signal originated;

a DSL concentrator coupled to said shared cable modem by a data path, said DSL concentrator having a plurality of XDSL modems, each XDSL modem coupled to a twisted pair telephone line which is coupled to said twisted pair input of a junction box in one of said diplexer filters and dedicated to sending downstream and receiving upstream XDSL signals to and from a particular subscriber who shares said cable modem via said twisted pair telephone lines dedicated to transmission of XDSL signals for said particular subscriber, each said XDSL modem for converting upstream XDSL signals to upstream XDSL packet data and sending each said packet to said cable modem via said DSL concentrator for transmission to said headend;

a plurality of siamese cable drop lines, each having a coaxial cable portion and a twisted pair telephone line portion, said coaxial cable portion coupled to said drop cable output of one of said diplexer filters and each said twisted pair telephone line coupled to said twisted pair output of a junction box associated with the same diplexer filter to which said coaxial cable portion of said siamese cable drop line is coupled, each siamese cable drop line for coupling to a local area network of one of said plurality of subscribers which share said cable modem.

14. A process comprising:

receiving simultaneously in a plurality of diplexer filters from a cable TV signal delivery medium downstream analog CATV signals and downstream RF signals carrying downstream packet data and upstream RF signals carrying upstream packet data and filtering out in each diplexer filter all but said downstream analog CATV signals, and, in each said diplexer filter, receiving from a LAN segment input baseband packet data transmissions, and, in each diplexer filter, combining said baseband packet data transmissions with said downstream analog CATV signals and transmitting the combined signals on a coaxial cable portion of a siamese cable drop line coupled to a distribution circuit of a predetermined one of a plurality of subscribers who share a cable modem located outside the premises of said subscribers, and selectively filtering to select upstream LAN packets from the coaxial cable portions of said siamese cable drop lines from a plurality of subscribers who share a cable modem, and transmitting said upstream LAN packets to the port of a shared packet switch dedicated to sending and receiving upstream and downstream LAN traffic for a particular one of said plurality of subscribers;

receiving simultaneously in said shared cable modem from said CATV signal delivery medium downstream analog CATV signals and downstream signals carrying downstream packet data and upstream signals carrying upstream packet data transmitted by other cable modems and filtering out in said shared cable modem all but said downstream signals carrying downstream packet data and recovering LAN packets and DSL packets therefrom, and filtering out all LAN and DSL packets not addressed to a subscriber that is sharing said cable modem and transmitting the selected downstream LAN and DSL packets out on a first LAN segment or other data path, and receiving upstream LAN and DSL packets from said first LAN segment and transmitting said upstream LAN and DSL packets to a headend using whatever media access protocol and physical layer protocol is in use on said CATV signal delivery medium;

receiving said downstream LAN and DSL packets transmitted on said first LAN segment or other data path in a shared packet switch, and determining to which subscriber who is sharing said cable modem each of said downstream LAN and DSL packets are directed, and routing each LAN packet to an appropriate LAN segment coupled to said LAN segment input of a diplexer filter dedicated to the subscriber to whom said LAN packet is addressed, and, in said diplexer filter, coupling said downstream LAN packets onto a coaxial cable portion of a siamese cable drop line dedicated to said subscriber to whom said LAN packet is addressed, and in each diplexer filter, selectively filtering to select upstream LAN packets from the coaxial cable portion of the siamese cable drop line dedicated to the subscriber from whom said upstream LAN packet originated and transmitting said selected upstream LAN packet to the appropriate port of said shared packet switch dedicated to sending and receiving LAN packets to and from said subscriber, and, in said packet switch, transmitting all said upstream LAN packets from all subscribers which share said packet switch to said shared cable modem;

in said shared cable modem, receiving one or more signals that carry downstream DSL packets and recovering said downstream DSL packets and discarding all but those downstream DSL packets addressed to one of said plurality of subscribers that share said cable modem and transmitting said DSL packets to a DSL concentrator, and receiving upstream DSL packets from said DSL concentrator and transmitting said upstream DSL packets to a headend using whatever media access protocol and physical layer protocol is in use on said CATV signal delivery medium;

in said DSL concentrator, receiving the downstream DSL packets for each subscriber which shares said cable modem and routing each said downstream DSL packet to an XDSL modem in said DSL concentrator that serves the particular subscriber to which said downstream DSL packet is directed;

in each said XDSL modem, converting said downstream DSL packets routed to said XDSL modem to a downstream XDSL signal and transmitting said downstream XDSL signal on a twisted pair phone line to a junction box of a diplexer filter coupled by a siamese cable drop line to the subscriber to whom said downstream XDSL signal is to be sent, and receiving upstream XDSL signals in each XDSL modem and converting said upstream XDSL signals to upstream DSL packets and transmitting said upstream DSL packets to said cable modem; and at each said junction box in a diplexer filter, coupling said XDSL signals travelling in both directions between a twisted pair phone line forming part of said siamese cable drop line coupled to the subscriber to whom said XDSL signal is to be sent and a twisted pair phone line coupling said junction box to an XDSL modem serving the subscriber to whom the XDSL signals are to be sent and received;

in every subscriber premises, selectively filtering to select the analog CATV signals on a coaxial cable portion of said siamese cable drop line and coupling said analog CATV signals onto a coaxial cable CATV signal distribution system in said subscriber premises, and selectively filtering to select said downstream LAN packets and transmit them on a local area network medium in said subscriber premises, and selectively filter to select upstream LAN packets from said local area network medium and couple them onto said coaxial cable portion of said siamese cable drop line, and coupling said downstream XDSL signals from a twisted pair portion of said siamese cable drop line onto a POTS phone signal distribution system in said subscriber premises, and coupling upstream XDSL signals from said POTS phone signal distribution system onto said twisted pair portion of said siamese cable drop line.

15. An apparatus comprising:

filtering and combining means for receiving from a cable TV signal delivery medium downstream analog CATV signals and downstream RF signals carrying downstream packet data and upstream RF signals carrying upstream packet data and filtering out all but said downstream analog CATV signals, and, for receiving from a plurality of LAN segments coupled to a plurality of LAN segment inputs, each dedicated to carrying LAN traffic for one of a plurality of subscriber who share said filtering and combining means, baseband downstream LAN packets, and for combining said baseband downstream LAN packets received at each said input with said downstream analog CATV signals and transmitting the combined signals on a coaxial cable portion of a siamese cable drop line dedicated to carrying signals to a subscriber to whom said downstream LAN packets are addressed, and for selectively filtering signals on said coaxial cable portion of each said siamese cable drop line to select upstream LAN packets and for transmitting said upstream LAN packets originating from each said subscriber who shares said filtering and combining means on one of said LAN segments that is dedicated to carrying LAN packet traffic for said subscriber;

shared cable modem means for receiving from a cable TV signal delivery medium downstream analog CATV signals and downstream RE signals carrying downstream LAN packets and upstream RF signals carrying upstream LAN packets transmitted by other cable modems and filtering out all but said downstream RE signals carrying downstream LAN packets and recovering said downstream LAN packets and ignoring all downstream LAN packets not addressed to a subscriber that is sharing said cable modem means and transmitting the selected downstream LAN packets out on a first LAN segment or other data path, and for receiving upstream LAN packets from said first LAN segment or other data path and transmitting them to a headend using whatever media access control and physical layer protocol is in use on said cable TV signal delivery medium for upstream transmissions;

packet switch means for receiving said downstream LAN packets transmitted on said first LAN segment or other data path, and determining to which subscriber each said downstream LAN packet is directed, and routing each packet to and transmitting said downstream LAN packets on an appropriate LAN segment dedicated to carrying upstream and downstream LAN packet traffic for the subscriber to whom said downstream LAN packets are addressed and which is coupled to an appropriate LAN segment input of said filtering and combining means, and for receiving upstream LAN packets from each said LAN segment dedicated to a particular subscriber and concentrating all said upstream LAN packets for transmission and transmitting all said upstream LAN packets on said first LAN segment or other data path to said cable modem means;

and wherein said shared cable modem means is also for receiving one or more radio frequency signals that carry digital data that is encoded with DSL signals directed a plurality of subscribers some of which share said cable modem and recovering said digital data that carries the DSL signals for each of the plurality of subscribers who share said cable modem, and transmitting said digital data to a DSL concentrator means via said first LAN segment or other data path, and for receiving upstream DSL packets and for transmitting them on said cable TV signal delivery medium using whatever media access control and physical layer protocol is in use on said cable TV signal delivery medium for upstream transmissions;

a DSL concentrator means for receiving said digital data that carries the downstream DSL signals for each subscriber which shares said cable modem from said shared cable modem means and for routing said digital data to the appropriate one of a plurality of XDSL modem means in or associated with said DSL concentrator that serves the particular subscriber to which said data is directed, and for receiving upstream DSL packets from said XDSL modems and routing them to said cable modem means;

a plurality of XDSL modem means, each for converting digital data routed to it to a conventional XDSL signal and transmitting said XDSL signal on a twisted pair phone line to the one of a plurality of junction boxes in said filtering and combining means dedicated to coupling XDSL signals to be delivered to a particular customer to the twisted pair portion of a siamese cable drop line coupled to the subscriber to whom said DSL signal is to be sent; and each said junction box structured to couple XDSL signals received from a particular XDSL modem means onto a twisted pair phone line forming part of said siamese cable drop line coupled to the subscriber to whom said XDSL signal is to be sent;

a plurality of siamese cable drop lines coupling said junction boxes to a plurality of subscribers, each having a twisted pair portion and a coaxial cable portion;

signal distribution means in each subscriber premises coupled to one of said siamese cable drop lines for selectively filtering to select analog CATV signals from the coaxial cable portion of said siamese cable drop line and couple said CATV signals onto a CATV signal distribution network at the premises of said subscriber, and for filtering to select downstream LAN packets from said coaxial cable portion of said siamese cable drop line and coupled them onto a LAN in said subscriber premises, and for coupling XDSL signals on a twisted pair portion of said siamese cable drop line onto a POTS telephone signal distribution network in said customer premises; and XDSL modem means coupled to said POTS telephone signal distribution network for converting said XDSL signal to LAN packet traffic on a second LAN in said subscriber premises.

16. A signal distribution system for serving a plurality of customers using a shared cable modem coupled to a shared cable TV signal distribution medium, comprising:

a shared cable modem coupled to said medium;

a plurality of siamese cable drop lines, each dedicated to carrying signals to one of the subscribers sharing said cable modem and each having a first coaxial cable data path and a second twisted pair telephone line data path, each first coaxial cable data path of a siamese cable drop line for coupling to a local area network and a CATV signal delivery system of one of said plurality of subscribers which share said cable modem, a shared local area network packet switch and concentrator coupled by a local area network segment or other data path to said modem and having at least one local area network port for each subscriber that shares said modem;

a plurality of diplexer filters, each dedicated to one of said subscribers who share said cable modem and each having a high frequency input coupled to said cable TV signal delivery medium and a low frequency input coupled to a port of said packet switch and concentrator dedicated to the same subscriber said diplexer filter is dedicated to, and each having a drop cable output for coupling to said first coaxial cable data path of a siamese cable drop line dedicated to the same subscriber said diplexer filter is dedicated to, each diplexer filter having a junction box therein having a twisted pair input and a twisted pair output for coupling to said twisted pair data path portion of the siamese cable drop line dedicated to the same subscriber said diplexer filter containing said junction box is dedicated to, each said diplexer filter and junction box combination functioning to filter out all signals appearing at said high frequency input except downstream analog cable TV broadcast signals and couple said analog cable TV broadcast signals onto said first coaxial cable data path of the siamese cable drop line coupled to said drop cable output, and to receive downstream baseband LAN packet data from the port of said packet switch dedicated to the customer said diplexer filter is dedicated to and couple said downstream LAN packet data onto said first coaxial cable data path Of said siamese cable drop line along with said analog cable TV signals, and for filtering to select upstream LAN packet data from said first coaxial cable data path of the siamese cable drop line from said subscriber and transmit said upstream LAN packet data to the port of said packet switch dedicated to carrying LAN packet data from the subscriber from which each upstream LAN packet originated, and said junction box for coupling upstream and downstream POTS signals between a twisted pair input of said junction box and said second twisted pair data path of the siamese cable drop line corresponding to the same subscriber said junction box/diplexer filter combination corresponds to;

a voice-over-IP gateway coupled to said shared cable modem by a LAN segment or other data path to receive downstream voice-over-IP packets from said cable modem and to transmit upstream voice-over-IP packets to said cable modem for upstream transmission to a headend, each voice-over-IP gateway having a plurality of subscriber line interface circuits that convert downstream voice-over-IP packet data to POTS signals and transmit them on a twisted pair telephone line coupled to said twisted pair input of the junction box corresponding to the subscriber to which said POTS signals are to be transmitted such that POTS signals output by each said subscriber line interface circuit are coupled through said junction box to said second twisted pair data path of the siamese cable drop line coupled to the subscriber to whom said POTS signals are to be delivered, each subscriber line interface circuit also for converting upstream POTS signals received from said second twisted pair data path of the siamese cable drop line corresponding to the subscriber said subscriber line interface circuit services and converting said upstream POTS signals to POTS digital data, and wherein said voice-over-IP gateway delivers said POTS digital data from each subscriber to said cable modem for upstream transmission to a headend; and means in each subscriber premises coupled to a siamese cable drop line from a diplexer filter/junction box combination for selecting analog downstream cable TV broadcast signals and coupling them onto a CATV signal distribution system in said subscriber's home and for selecting downstream LAN packets from said first coaxial cable data path and coupling them onto a LAN transmission medium in said subscriber premises and for selecting upstream LAN packets from said LAN transmission medium in said subscriber premises and for coupling them onto said first coaxial cable data path of said siamese cable drop line, and for coupling upstream and downstream POTS signals between a phone line distribution system in said subscriber premises and said second twisted pair data path of said siamese cable drop line.

17. A process comprising:

receiving from a transmission medium a plurality of signals including downstream analog CATV signals in each of a plurality of diplexer filters, and, in each diplexer filter, filtering out all but said downstream analog CATV signals, and, in each said diplexer filter, receiving at a baseband LAN input downstream baseband LAN packet data transmissions, and combining said downstream LAN packet data transmissions with said analog CATV signals and transmitting the combined signals on a coaxial cable portion of a siamese cable drop line coupled to a local area network of a predetermined one of a plurality of subscribers who is served by said diplexer filter, said plurality of subscribers all sharing a cable modem located outside the premises of said plurality of subscribers, and, in each diplexer filter, selecting upstream LAN packets from said coaxial cable portion of said siamese cable drop line and coupling them onto a LAN segment coupling said diplexer filter to a subscriber line interface circuit dedicated to servicing the subscriber from whom each said upstream LAN packet originated, and, in the junction box of each diplexer filter, coupling both upstream and downstream POTS telephone signals (hereafter upstream POTS and downstream POTS) between a twisted pair portion of said siamese cable drop line and a twisted pair coupled to a subscriber line interface circuit dedicated to servicing the subscriber from whom said upstream POTS originated;

receiving a plurality of signals from said transmission medium in a shared cable modem and filtering out all but downstream RF signals carrying downstream voice-over-IP packet data and LAN packet data, and recovering said downstream voice-over-IP packet data and LAN packet data, and selecting from said recovered packets only voice-over-IP packets and LAN packets addressed to a subscriber that is sharing said cable modem, and transmitting the selected downstream voice-over-IP packets out on a first LAN segment or other data path to a voice-over-IP gateway, and transmitting said LAN packets out on said first LAN segment or other data path to a packet switch shared by the same subscribers who share said cable modem, and receiving upstream LAN packet and upstream voice-over-IP packets from said shared packet switch and voice-over-IP gateway, respectively, and transmitting said packets to a headend using whatever media access control and physical layer protocols are used for the upstream on said transmission medium;

receiving said downstream voice-over-IP packets transmitted on said first LAN segment or other data path in said voice-over-IP gateway, and determining to which subscriber who is sharing said cable modem each said downstream voice-over-IP packet is directed, and routing each downstream voice-over-IP packet to an appropriate subscriber line interface circuit which is coupled by a twisted pair telephone line to a twisted pair input of a junction box in a diplexer filter which services the subscriber to whom said downstream voice-over-IP packet is directed, and, in each said subscriber line interface circuit converting said voice-over-IP packet data to said downstream POTS and transmitting said downstream POTS on said twisted pair, and, in each said subscriber line interface circuit and converting upstream POTS to digital data and in said voice-over-IP gateway, converting said digital data from each subscriber line interface circuit to upstream voice-over-IP packets and sending them to said shared cable modem;

in said packet switch, receiving the downstream LAN packet data from said cable modem for each subscriber which shares said cable modem and routing said each downstream LAN packet to an appropriate LAN port in said switch which is coupled via a LAN segment and transmitting said downstream LAN packet to the subscriber to whom the packet is addressed via said LAN segment and said baseband LAN input of a diplexer filter dedicated to said subscriber and the coaxial cable portion of a siamese cable drop line to a LAN of a subscriber to which each said LAN packet is addressed, and receiving from each subscriber and the diplexer filter, LAN segment and LAN port dedicated to said subscriber said upstream LAN packets and transmitting them to said cable modem: for transmission to a headend;

in each subscriber premises, selectively filtering to select said downstream analog CATV signals and coupling them onto a CATV signal distribution network inside said subscriber premises, and selectively filtering to select downstream LAN packets and coupling them onto a LAN transmission medium inside said subscriber premises, and selectively filtering so as to couple upstream LAN packets from said LAN transmission medium onto said coaxial cable portion of said siamese cable drop line, and coupling said downstream POTS from said twisted pair portion of said siamese cable drop line to a telephone signal distribution system inside said customer premises, and coupling upstream POTS from said telephone signal distribution system inside said customer premises to said twisted pair portion of said siamese cable drop line.

18. An apparatus comprising:

filtration and combining means coupled to a cable TV signal delivery medium and having a plurality of diplexer filters, each dedicated to serving one subscriber and each having a junction box means, for filtering out all but downstream analog CATV signals from signals received from said cable TV signal delivery medium, and for receiving at a baseband LAN input baseband packet data transmissions, and for combining said baseband packet data transmissions with said downstream analog CATV signals and transmitting the combined signals on a coaxial cable portion of a siamese cable drop line coupled to a local area network of a predetermined one of a plurality of subscribers who share a cable modem means located outside the premises Of said subscribers, and for filtering to select upstream LAN packets from signals on said coaxial cable portion of a siamese cable drop line and transmit them on a LAN segment coupled to said baseband LAN input, each said junction box means for coupling upstream and downstream POTS signals between a twisted pair portion of said siamese cable drop line and a twisted pair segment;

cable modem means for receiving and recovering downstream voice-over-IP packet data and downstream LAN packets from signals propagating on said cable TV signal delivery medium, and for filtering out all voice-over-IP packets and LAN packet not addressed to a subscriber that is sharing said cable modem means and transmitting the selected packets out on a first LAN segment or other data path to a voice-over-IP gateway means and to a packet switch means, and for receiving upstream LAN and voice-over-IP packets and transmitting them to a headend using whatever media access control and physical layer protocol is in use for upstream transmissions on said cable TV signal delivery medium;

voice-over-IP gateway means for receiving said voice-over-IP packets transmitted on said first LAN segment or other data path and for determining to which subscriber each said voice-over-IP packet is directed, and routing each voice-over-IP packet to an appropriate one of a plurality of subscriber line interface circuit means which is coupled by a twisted pair segment telephone line to a twisted pair input of one of said junction box means in said filtration and combining means which is coupled by a siamese cable drop line to the premises of the subscriber to which said voice-over-IP packet is addressed, and for receiving data from each subscriber line interface circuit means created from upstream POTS signals from the subscriber to which said subscriber line interface circuit means is dedicated and packetizing said data as a voice-over-IP packet and transmitting said voice-over-IP packet to said cable modem means;

a plurality of subscriber line interface circuit means, each for converting said voice-over-IP packet data routed to it by said voice-over-IP gateway means to a downstream POTS signal and transmitting said downstream POTS signal on a twisted pair segment telephone line coupled to a junction box means in said filtration and combining means which is coupled to the subscriber to which said downstream POTS signal is to be delivered;

a packet switch means for receiving downstream LAN packet data for each subscriber which shares said cable modem means from said first LAN segment or other data path coupled to said shared cable modem, and for routing said downstream LAN packet data to an appropriate LAN port in said packet switch means which is coupled to the LAN of a subscriber to which said LAN packet data is addressed via a LAN segment coupled to the baseband LAN input of said filtration and combining means that is dedicated to LAN traffic of said subscriber, and, at each said LAN port, transmitting said LAN packet data on said LAN segment to said filtration and combining means, said packet switch means also for receiving upstream LAN packets and routing them to said cable modem means.

19. A signal distribution system, comprising:

a shared network device, having one or more cable modem, each shared by a plurality of consumers and each coupled to a headend through a transmission medium;

a media terminal adapter coupled to receive LAN packets and VOIP packets from said shared cable modem via a LAN segment and functioning to convert downstream VOIP packets into analog downstream POTS signals in a POTS frequency band and modulate said downstream LAN packets onto a data carrier having a spectrum which does not conflict with the spectrum of said POTS signals, and functioning to receive upstream POTS signals and convert them to upstream VOIP packets and send them to said shared network device and to receive upstream LAN packets and transmit them to said shared network device; and a LAN segment coupled to a LAN inside a subscriber premises, for carrying analog upstream and downstream POTS signals and LAN packets modulated on a data carrier having a frequency outside the frequency band of said POTS signals.

20. A signal distribution system, comprising:

a shared network device means, having one or more cable modem means, each shared by a plurality of consumers and each coupled to a headend through a transmission medium; said shared network device means for supplying analog~ signals directly to each of a plurality of subscribers who share said shared network device means and each said cable modem means for receiving and recovering downstream LAN and VOIP packets addressed to one of the subscribers who shares said cable modem means and for transmitting said recovered LAN and VOIP packets on a first LAN segment, and said cable modem means also for receiving upstream LAN and VOIP packets from each subscriber who shares a cable modem means, and transmitting them to a headend via said transmission medium using whatever media access control and physical layer protocols are in use for upstream transmissions on said transmission medium;

a plurality of media terminal adapter means, each dedicated to servicing a particular subscriber who shares a shared cable modem to which said media terminal adapter means is coupled, each said media terminal adapter means coupled via a LAN segment to receive downstream LAN packets and VOIP packets from a shared cable modem, each media terminal adapter means for converting downstream VOIP packets into analog downstream POTS signals in a POTS frequency band and for modulating said LAN packets onto a data carrier having a spectrum which does not conflict with the spectrum of said downstream POTS signals, and for receiving upstream POTS signals and convert them to upstream VOIP packets and sending them to said shared network device and for receiving upstream LAN packets and transmitting them to the appropriate shared cable modern means of said shared network device; and plurality of LAN segments, each LAN segment coupled to a LAN inside a particular subscriber's premises for carrying analog upstream and downstream POTS signals and LAN packets modulated on a data carrier having a frequency outside the frequency band of said POTS signals.

21. A signal distribution process, comprising the steps of:

supplying analog CATV signals directly to each of a plurality of subscribers who share a shared network device and using each of a plurality of shared cable modems to receive and recover downstream LAN and VOIP packets addressed to one of the subscribers who shares said cable modem and transmitting each said recovered LAN and VOIP packet addressed to a particular subscriber who shares said cable modem on a first LAN segment to a media terminal adapter which is dedicated to processing traffic to and from that subscriber;

receiving upstream LAN and VOIP packets from each subscriber who shares said network device and transmitting them to a shared cable modern shared by the subscriber from whom said upstream LAN and VOIP packets originated and using said cable modem to transmit said upstream LAN and VOIP packets to a headend via said transmission medium using whatever media access control and physical layer protocols are in use for upstream transmissions on said transmission medium;

in each of said plurality of media terminal adapters, converting downstream VOIP packets into analog downstream POTS signals in a POTS frequency band and modulating said LAN packets onto a data carrier having a spectrum which does not conflict with the spectrum of said downstream POTS signals, and receiving upstream POTS signals and converting them to upstream VOIP packets and sending them to the cable modem shared by the subscriber from who said upstream POTS signals originated, and receiving upstream LAN packets and transmitting them to the cable modern shared by the subscriber from who said upstream LAN packets originated.

* * * * *